(12) United States Patent
Ikeda et al.

(10) Patent No.: US 8,711,301 B2
(45) Date of Patent: Apr. 29, 2014

(54) CELLULOSE ACYLATE LAMINATE FILM, METHOD FOR PRODUCING CELLULOSE ACYLATE LAMINATE FILM, POLARIZER AND LIQUID CRYSTAL DISPLAY DEVICE

(75) Inventors: Akira Ikeda, Kanagawa (JP); Jun Takeda, Kanagawa (JP); Hiromichi Tachikawa, Kanagawa (JP); Shinya Watanabe, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1004 days.

(21) Appl. No.: 12/767,905

(22) Filed: Apr. 27, 2010

(65) Prior Publication Data

US 2010/0271574 A1 Oct. 28, 2010

(30) Foreign Application Priority Data

| Apr. 28, 2009 | (JP) | 2009-109948 |
| Oct. 28, 2009 | (JP) | 2009-247638 |
| Apr. 8, 2010 | (JP) | 2010-089211 |

(51) Int. Cl.
*G02F 1/1335* (2006.01)

(52) U.S. Cl.
USPC .......................... 349/96; 349/117

(58) Field of Classification Search
None
See application file for complete search history.

(56) References Cited

U.S. PATENT DOCUMENTS

| 6,281,956 B1 | 8/2001 | Ohmuro et al. |
| 2007/0214467 A1* | 9/2007 | Fukuda et al. ............. 720/718 |
| 2009/0257003 A1* | 10/2009 | Yoshihara et al. ......... 349/96 |

FOREIGN PATENT DOCUMENTS

| JP | 08-207210 A | 8/1996 |
| JP | 3027805 B2 | 4/2000 |
| JP | 2002-192656 A | 7/2002 |
| JP | 2003-033998 A | 2/2003 |
| JP | 3459779 B2 | 10/2003 |
| JP | 2006-290929 A | 10/2006 |
| TW | 200740605 A1 | 11/2007 |

OTHER PUBLICATIONS

Chinese Office Action dated Oct. 9, 2013, issued in corresponding Chinese Patent Application No. 201010171351.0 and English Language Excerption of Chinese Office Action (30 pgs.)
Japanese Office Action dated Oct. 22, 2013, issued in corresponding Japanese Patent Application No. 2010-089211 and English Language Excerption of Japanese Office Action (8 pgs.)

* cited by examiner

*Primary Examiner* — Wen-Ying P Chen
(74) *Attorney, Agent, or Firm* — Buchanan Ingersoll & Rooney PC

(57) ABSTRACT

A cellulose acylate laminate film, which comprises a low-substitution layer comprising a non-phosphate compound and a cellulose acylate having a total degree of acyl substitution of more than 2.0 and less than 2.7 and a high-substitution layer comprising a cellulose acylate having a total degree of acyl substitution of more than 2.7<Z2, wherein Re at a wavelength of 550 nm is the same as or larger than Re at a wavelength of 440 nm.

20 Claims, 1 Drawing Sheet

CELLULOSE ACYLATE LAMINATE FILM, METHOD FOR PRODUCING CELLULOSE ACYLATE LAMINATE FILM, POLARIZER AND LIQUID CRYSTAL DISPLAY DEVICE

CROSS-REFERENCE TO RELATED APPLICATIONS

The present application claims the benefit of priority from Japanese Patent Application No. 2009-109948, filed on Apr. 28, 2009, Japanese Patent Application No. 2009-247638, filed on Oct. 28, 2009, and Japanese Patent Application No. 2010-089211, filed on Apr. 8, 2010, the contents of which are herein incorporated by reference in their entirety.

BACKGROUND OF THE INVENTION

1. Field of the Invention

The present invention relates to a cellulose acylate laminate film and a method for producing a cellulose acylate laminate film, and to a polarizer and a liquid crystal display device.

2. Description of the Related Art

In recent years, TV application of liquid crystal display devices is being more popular, and with TV screens getting larger, quality enhancement and cost reduction of display devices are much required. In particular, VA-mode liquid crystal display devices have high contrast and their production yield is relatively high, and therefore, they are the most popular for liquid crystal display devices for TV use.

However, VA-mode liquid crystal display devices have a problem in that, at the time of black level of display, the VA-mode liquid crystal display devices could exhibit almost complete black images in the normal direction of the display panel, but when the black-level panel is observed in oblique directions thereof, then there occurs light leakage that makes background black expression impossible, and therefore the viewing angle is narrowed. Accordingly, in recent years, a liquid crystal display device having a high contrast and having further improved viewing angle characteristics is desired.

For solving the problem of viewing angle characteristics, for example, there is proposed a method of reducing the light leakage in observation of a liquid crystal display device in oblique directions at the time of black level of display, by incorporating therein a combination of a first retardation film having a positive monoaxial refractive anisotropy and a second retardation film having a negative refractive anisotropy of which the thickness-direction refractive index is fully smaller than the in-plane refractive index thereof (for example, Japanese Patent 3027805).

However, the method described in Japanese Patent 3027805 could reduce the light leakage only within a specific wavelength range (for example, green light at around 550 nm), in which, therefore, there still occurs light leakage in the other wavelength region where the wavelength dispersion characteristics of the retardation film and the wavelength dispersion characteristics of the liquid crystal cell are incompatible with each other (for example, blue light at around 450 nm, and red light at around 650 nm). Accordingly, when the liquid crystal display device described in Japanese Patent 3027805 is observed in oblique directions at the time of black level of display, then the panel is colored in blue and red, therefore bringing about a problem of color shift. Therefore, the method described in Japanese Patent 3027805 is not still satisfactory from the viewpoint of solving the problem of viewing angle characteristics.

As a method of solving the problem of color shift in observation of liquid crystal display devices in oblique directions at the time of black level of display, it is investigated to improve the wavelength dispersion characteristics of the film for use in the retardation film in order that the wavelength dispersion characteristics of the retardation film could be compatible with the wavelength dispersion characteristics of the liquid crystal cell. As a method of improving the wavelength dispersion characteristics of the retardation plate, disclosed is a method of stretching a film of a cellulose acetate having a specific degree of acetylation to give a cellulose acetate film of which the birefringence is larger at a longer wavelength (see Japanese Patent 3459779).

Use of the film of which the birefringence is larger at a longer wavelength described in Japanese Patent 3459779 could solve the problem of color shift in some degree; however, the film could control only the wavelength dispersion characteristics of retardation but rather brings about another problem of haze increase. When a film having a problem of high haze is incorporated in a liquid crystal display device, then the contrast ratio of the image to be displayed lowers, and therefore, the problem to satisfy the two requirements of high contrast and improved viewing angle characteristics is not still solved.

On the other hand, JP-A 2003-33998 and JP-A 8-207210 disclose a cellulose ester laminate film having a specific laminate structure and having a reduced haze. In these references, in addition to the haze of the film, the other characteristics such as the moisture permeability and the dimensional stability thereof are investigated; however, the wavelength dispersion characteristics of retardation of the film are not investigated at all.

SUMMARY OF THE INVENTION

The present invention has been made in consideration of the above situation, and its object is to provide a cellulose acylate laminate film having a low haze and having improved wavelength dispersion characteristics of retardation, and a method for producing it. Another object of the invention is to provide a polarizer and a liquid crystal display device comprising the film.

The present inventors have assiduously studied for the purpose of solving the above-mentioned problems and, as a result, have found that a cellulose acylate laminate film having a low haze and having improved wavelength dispersion characteristics of retardation can be obtained by stretching a laminate film that comprises a low-substitution layer containing a low-substitution cellulose acylate, of which the degree of acyl substitution falls within a specific range, and a specific compound, and a high-substitution layer containing a cellulose acylate of which the degree of acyl substitution is higher than that of the cellulose acylate in the low-substitution layer. Specifically, the above-mentioned problems can be solved by the following measures.

[1] A cellulose acylate laminate film, which comprises:
a low-substitution layer comprising a non-phosphate compound and a cellulose acylate that satisfies the following formula (1):

$$2.0 < Z1 < 2.7 \tag{1}$$

wherein Z1 means the total degree of acyl substitution of the cellulose acylate of the low-substitution layer, and
a high-substitution layer comprising a cellulose acylate that satisfies the following formula (2):

$$2.7 < Z2, \tag{2}$$

wherein Z2 means the total degree of acyl substitution of the cellulose acylate of the high-substitution layer, and
wherein:
the high-substitution layer is laminated on at least one face of the low-substitution layer, and
the in-plane retardation of the film at a wavelength of 550 nm, Re(550), is the same as or larger than the in-plane retardation of the film at a wavelength of 440 nm, Re(440).

[2] The cellulose acylate laminate film of [1], wherein the in-plane retardation of the film at a wavelength of 550 nm, Re(550), is larger than the in-plane retardation of the film at a wavelength of 440 nm, Re(440).

[3] The cellulose acylate laminate film of [1] or [2], wherein the high-substitution layer comprises a non-phosphate compound as an additive and the proportion (part by mass) of the additive to the cellulose acylate in the high-substitution layer is smaller than the proportion (part by mass) of the additive to the cellulose acylate in the low-substitution layer.

[4] The cellulose acylate laminate film of any one of [1] to [3], wherein the non-phosphate compound is a non-phosphate ester compound.

[5] The cellulose acylate laminate film of any one of [1] to [3], wherein the non-phosphate compound is a polyester compound having an aromatic ring.

[6] The cellulose acylate laminate film of any one of [1] to [5], wherein the in-plane retardation of the film at a wavelength of 590 nm, Re, satisfies 25 nm≤|Re|≤100 nm and the thickness-direction retardation of the film at a wavelength of 590 nm, Rth, satisfies 50 nm≤|Rth|≤300 nm.

[7] The cellulose acylate laminate film of any one of [1] to [6], wherein the thickness-direction retardation of the film at a wavelength of 550 nm, Rth(550), is the same as or larger than the thickness-direction retardation of the film at a wavelength of 440 nm, Rth(440).

[8] The cellulose acylate laminate film of any one of [1] to [7], wherein the thickness-direction retardation of the film at a wavelength of 550 nm, Rth(550), is larger than the thickness-direction retardation of the film at a wavelength of 440 nm, Rth(440).

[9] The cellulose acylate laminate film of any one of [1] to [8], of which the internal haze is at most 0.2%.

[10] The cellulose acylate laminate film of any one of [1] to [9], wherein the low-substitution layer comprises at least one retardation enhancer.

[11] The cellulose acylate laminate film of any one of [1] to [10], wherein the discotic compound as the retardation enhancer is in an amount of less than 3 parts by mass relative to 100 parts by mass of the cellulose acylate.

[12] The cellulose acylate laminate film of any one of [1] to [11], wherein the cellulose acylate of the low-substitution layer satisfies the following formulae (3) and (4):

$$1.0<X1<2.7, \qquad (3)$$

$$0 \le Y1<1.5, \qquad (4)$$

$$X1+Y1=Z1 \qquad (4')$$

wherein X1 means the degree of acetyl substitution of the cellulose acylate of the low-substitution layer,
Y1 means the total degree of substitution with acyl having at least 3 carbon atoms of the cellulose acylate of the low-substitution layer, and
Z1 means the total degree of acyl substitution of the cellulose acylate of the low-substitution layer.

[13] The cellulose acylate laminate film of any one of [1] to [12], wherein the cellulose acylate of the high-substitution layer satisfies the following formulae (5) and (6):

$$1.2<X2<3.0, \qquad (5)$$

$$0 \le Y2<1.5, \qquad (6)$$

$$X2+Y2=Z2 \qquad (6')$$

wherein X2 means the degree of acetyl substitution of the cellulose acylate of the high-substitution layer, Y2 means the total degree of substitution with acyl having at least 3 carbon atoms of the cellulose acylate of the high-substitution layer, and 2 means the total degree of acyl substitution of the cellulose acylate of the high-substitution layer.

[14] The cellulose acylate laminate film of any one of [1] to [13], wherein both faces of the low-substitution layer have the high-substitution layer in which the compositions of the high-substitution layers may be the same or different.

[15] The cellulose acylate laminate film of any one of [1] to [14], wherein the acyl group in the cellulose acylate has from 2 to 4 carbon atoms.

[16] The cellulose acylate laminate film of any one of [1] to [15], wherein the cellulose acylate is cellulose acetate.

[17] The cellulose acylate laminate film of any one of [1] to [16], wherein the mean thickness of the low-substitution layer is from 30 to 100 μm, and the mean thickness of at least one high-substitution layer is from 0.2% to less than 25% of the mean thickness of the low-substitution layer.

[18] The cellulose acylate laminate film of any one of [1] to [17], wherein at least one high-substitution layer comprises a matting agent.

[19] A method for producing a cellulose acylate laminate film, comprising:
forming a cellulose acylate laminate film by sequential casting or simultaneous co-casting of a cellulose acylate solution for low-substitution layer that comprises a non-phosphate compound and a cellulose acylate satisfying the following formula (1), and a cellulose acylate solution for high-substitution layer that comprises a cellulose acylate satisfying the following formula (2):

$$2.0<Z1<2.7, \qquad (1)$$

wherein Z1 means the total degree of acyl substitution of the cellulose acylate of the low-substitution layer, $$2.7<Z2, \qquad (2)$$

wherein Z2 means the total degree of acyl substitution of the cellulose acylate of the high-substitution layer, and
stretching the cellulose acylate laminate film at a temperature of not lower than (Tg−30° C.) under the condition that the film comprises the residual solvent in an amount of at least 5% by mass of the film, wherein Tg means the glass transition temperature of the cellulose acylate laminate film.

[20] The method for producing a cellulose acylate laminate film of [19], wherein the non-phosphate compound is a non-phosphate ester compound.

[21] The method for producing a cellulose acylate laminate film of [19] or [20], wherein the cellulose acylate solution for the low-substitution layer and the cellulose acylate solution for the high-substitution layer are simultaneously co-cast.

[22] The method for producing a cellulose acylate laminate film of any one of [19] to [21], further comprising drying the cellulose acylate laminate film after the stretching, and stretching the dried cellulose acylate laminate film at a temperature of not lower than (Tg−10° C.), wherein Tg means the glass transition temperature of the cellulose acylate laminate film.

[23] The method for producing a cellulose acylate laminate film of any one of [19] to [22], wherein in the stretching at a temperature of not lower than (Tg−30° C.), the film is stretched in the direction perpendicular to the machine direction in film formation (film conveying direction).

[24] The method for producing a cellulose acylate laminate film of any one of [19] to [23], wherein the viscosity at 25° C. of the cellulose acylate solution for the low-substitution layer is higher by at least 10% than the viscosity at 25° C. of the cellulose acylate solution for the high-substitution layer.

[25] A cellulose acylate laminate film produced according to the cellulose acylate laminate film production method of any one of [19] to [24].

[26] A polarizer comprising at least one cellulose acylate laminate film of any one of [1] to [18] and [25].

[27] A liquid crystal display device comprising at least one cellulose acylate laminate film of any one of [1] to [18] and [25].

[28] An IPS, OCB or VA-mode liquid crystal display device having a liquid crystal cell and a pair of polarizers arranged on both sides of the liquid crystal cell, wherein at least one polarizer is the polarizer of [26].

According to the invention, there is provided a cellulose acylate laminate film having a low haze and having improved wavelength dispersion characteristics of retardation. According to the invention, the film can e produced stably in a simplified manner, and its production cost is low. According to the invention, there is provided a liquid crystal display device, especially a VA-mode liquid crystal display device having a high contrast ratio and having improved viewing angle characteristics, by incorporating the film or a polarizer comprising the film into the liquid crystal display device. The liquid crystal display device of the invention has solved the problem of light leakage at the time of black level of display, not only at a specific wavelength but also at other wavelengths of a broad range; and therefore, the device has solved the problem of color shift in observation thereof in oblique directions, and the viewing angle characteristics of the device of the invention have been remarkably improved to be better than before.

BRIEF DESCRIPTION OF DRAWINGS

In FIG. 1, 11 is polarizing element, 12 is polarizing element, 13 is liquid crystal cell, 14 is cellulose acylate film of Examples and Comparative Examples, and 15 is optically anisotropic film (Fujitac TD80UL).

In FIG. 2, 1 is surface layer dope, 2 is core layer dope, 3 is co-casting Giesser die, and 4 is casting support.

BEST MODE FOR CARRYING OUT THE INVENTION

Figure 1:
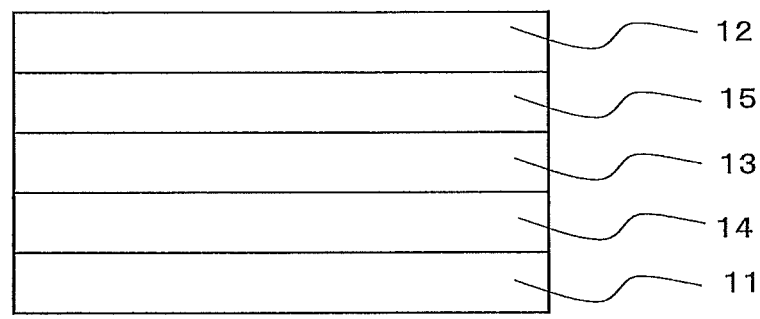
FIG. 1 is a schematic cross-sectional view of one example of the liquid crystal display device of the invention.

Description will now be made in detail of the cellulose acylate laminate film of the invention, the method for producing it, the additives used therein and so on.

Although the following description of its structural features may often be made on the basis of typical embodiments of the invention, it is to be understood that the invention is not limited to any such embodiment. It is also to be noted that every numerical range as herein expressed by employing the words "from" and "to", or simply the word "to", or the symbol "~" is supposed to include the lower and upper limits thereof as defined by such words or symbol, unless otherwise noted. In this description, Re and Rth mean values measured at a wavelength of 590 nm, unless otherwise specified.

In the invention, "mass %" means equal to "weight %", and "% by mass" means equal to "% by weight".

[Cellulose Acylate Laminate Film]

The cellulose acylate laminate film of the invention (hereinafter this may be referred to as the film of the invention) comprises a low-substitution layer comprising a non-phosphate compound and a cellulose acylate that satisfies the following formula (1):

$$2.0 < Z1 < 2.7 \quad (1)$$

wherein Z1 means the total degree of acyl substitution of the cellulose acylate of the low-substitution layer, and a high-substitution layer comprising a cellulose acylate that satisfies the following formula (2):

$$2.7 < Z2, \quad (2)$$

wherein Z2 means the total degree of acyl substitution of the cellulose acylate of the high-substitution layer. The high-substitution layer is laminated on at least one face of the low-substitution layer. The in-plane retardation of the film at a wavelength of 550 nm, Re(550), is the same as or larger than the in-plane retardation of the film at a wavelength of 440 nm, Re(440).

Of the cellulose acylate laminate film of the invention having the constitution as above, the wavelength dispersion characteristics of retardation are regulated according to the characteristics of the liquid crystal cell to which the film is applied. Regarding the fact that the cellulose acylate laminate film of the invention has improved wavelength dispersion characteristics of retardation and that the liquid crystal display device comprising the film of the type solves the problem of color shift in observation of the display panel thereof in oblique directions at the time of black level of display, referred to is the description given in JP-A 2008-262161.

The invention is described in detail hereinunder with reference to preferred embodiments of the film of the invention.

(Cellulose Acylate)

The cellulose acylate for use in the constitutive layers in the invention satisfies the above formulae (1) and (2) in point of the total degree of acyl substitution therein. The acylate material, cellulose includes cotton linter and wood pulp (hardwood pulp, softwood pulp), etc. Any cellulose acylate obtained from any cellulose material is usable herein; and as the case may be, a mixture of different types of cellulose materials may be used. Cellulose materials for use herein are described in detail, for example, in Marusawa & Uda, "Plastic Material Lecture (17) Cellulose Resin" (published by Nikkan Kogyo Shinbun, 1970), and Hatsumei Kyokai Disclosure Bulletin No. 2001-1745 (pp. 7-8).

The film for use in the invention may have only one type of an acyl group, or two or more different types of acyl groups. Preferably, the film in the invention has an acyl group having from 2 to 4 carbon atoms as the substituent. In case where the film has two or more different types of acyl groups, preferably, one of them is an acetyl group. The acyl group having from 2 to 4 carbon atoms is preferably a propionyl group or a butyryl group. The cellulose acylate may form a solution of good solubility, and especially in a non-chlorine organic solvent, it may form a good solution. In particular, a solution having a low viscosity and good filterability can be produced.

Cellulose acylate preferred for use in the invention is described in detail. The β-1,4-bonding glucose unit to constitute cellulose has a free hydroxyl group at the 2-, 3- and 6-position. Cellulose acylate is a polymer prepared by acylating a part or all of these hydroxyl groups with acyl groups.

The degree of acyl substitution means the total of the proportion of acylation of the hydroxyl groups at the 2-, 3- and 6-positions of cellulose, and 100% acylation at each position corresponds to a degree of substitution of 1.

The acyl group having two or more carbon atoms in the cellulose used in the invention may be an aliphatic group or an aryl group, and are not particularly limited. They may be an alkylcarbonyl ester of cellulose, an alkenylcarbonyl ester of cellulose, an aromatic carbonyl ester of cellulose or an aromatic alkylcarbonyl ester of cellulose. These esters may have a substituent. Preferable examples of the substituents include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group and a cinnamoyl group. An acetyl group, a propionyl group, a butanoyl group, a dodecanoyl group, an octadecanoyl group, a tert-butanoyl group, an oleoyl group, a benzoyl group, a naphthylcarbonyl group and a cinnamoyl group are more preferred, and an acetyl group, a propionyl group and a butanoyl group (in case where the acyl group has from 2 to 4 carbon atoms) are particularly preferred, and the most preferred is an acetyl group (in case where the cellulose acylate is a cellulose acetate).

In acylation of cellulose, when an acid anhydride or an acid chloride is used as the acylating agent, the organic solvent as the reaction solvent may be an organic acid, such as acetic acid, or methylene chloride or the like.

When the acylating agent is an acid anhydride, the catalyst is preferably a protic catalyst such as sulfuric acid; and when the acylating agent is an acid chloride (e.g., $CH_3CH_2COCl$), a basic compound may be used as the catalyst.

A most popular industrial production method for a mixed fatty acid ester of cellulose comprises acylating cellulose with a fatty acid corresponding to an acetyl group and other acyl groups (e.g., acetic acid, propionic acid, valeric acid, etc.), or with a mixed organic acid ingredient containing their acid anhydride.

In the film of the invention, the cellulose acylate for the low-substitution layer preferably satisfies the following formulae (3) and (4) from the viewpoint of the wavelength dispersion characteristics of retardation of the film.

$$1.0 < X1 < 2.7 \quad (3)$$

wherein X1 means the degree of acetyl substitution of the cellulose acylate of the low-substitution layer.

$$0 \leq Y1 < 1.5 \quad (4)$$

wherein Y1 means the total degree of substitution with acyl having at least 3 carbon atoms of the cellulose acylate of the low-substitution layer.

With Z1 in formula (1), X1 and Y1 satisfy X1+Y1=Z1.

In the film of the invention, the cellulose acylate for the high-substitution layer preferably satisfies the following formulae (5) and (6) from the viewpoint of the wavelength dispersion characteristics of retardation of the film.

$$1.2 < X2 < 3.0 \quad (5)$$

wherein X2 means the degree of acetyl substitution of the cellulose acylate of the high-substitution layer.

$$0 \leq Y2 < 1.5 \quad (6)$$

wherein Y2 means the total degree of substitution with acyl having at least 3 carbon atoms of the cellulose acylate of the high-substitution layer.

With Z2 in formula (2), X2 and Y2 satisfy X2+Y2=Z2.

Cellulose acylate for use in the invention may be produced, for example, according to the method described in JP-A 10-45804.

It is known that cellulose acylate contains a slight amount of metal components that was introduced during the process for production thereof.

It is also known that when the cellulose acylate is cast for film formation, the slight amount of metal components may contaminate the surface of a casting support to deteriorate the properties of the formed film and cause a problem in the film formation process. Cellulose acylate containing a lower amount of the metal components is preferable.

Slight amount of the metal components can be quantitated by an analytic method such as ionic chromatography, atomic absorption spectrum, ICP, ICP-MS of a cellulose acylate sample.

(Non-Phosphate Compound)

The film of the invention contains a non-phosphate compound in the low-substitution layer. The non-phosphate compound in the layer exhibits an effect of reducing the haze of the film. In addition, even when the film of the invention has a low Nz factor (as described below), the film containing such a non-phosphate compound can easily exhibit both the effect of retardation enhancement and the effect of haze reduction.

In this description, the "non-phosphate compound" means "a compound having an ester bond in which the acid contributing to the ester bond is one except phosphoric acid". In other words, the "non-phosphate compound" means an ester compound not containing phosphoric acid.

The non-phosphate compound may be a low-molecular compound or a polymer (high-molecular compound). The non-phosphate compound in the form of a polymer may be hereinafter referred to as a non-phosphate polymer.

In the film of the invention, preferably, the high-substitution layer contains the non-phosphate compound as an additive, and the proportion (part by mass) of the additive to the cellulose acylate contained in the high-substitution layer is smaller than the proportion (part by mass) of the additive to the cellulose acylate contained in the low-substitution layer, from the viewpoint of haze reduction. The non-phosphate compound for use in the invention is described below.

As the non-phosphate compound, widely usable are high-molecular additives and low-molecular additives known as additives to cellulose acylate films. Preferably, the amount of the additive is from 1 to 35% by mass of the cellulose resin, more preferably from 4 to 30% by mass, even more preferably from 10 to 25% by mass.

The high-molecular additive for use as the non-phosphate compound in the film of the invention has a recurring unit in the compound, and its number-average molecular weight is preferably from 700 to 10000. The high-molecular additive has a function of increasing the evaporation speed of solvent in a solution casting method, and a function of reducing the residual solvent amount. In addition, the additive exhibits various useful effects from the viewpoint of improving the film quality of, for example, improving the mechanical property thereof, imparting flexibility to the film, imparting absorption resistance thereto and reducing the water permeation through the film.

The number-average molecular weight of the high-molecular additive of non-phosphate compound for use in the invention is more preferably from 700 to 8000, even more preferably from 700 to 5000, still more preferably from 1000 to 5000.

The high-molecular additive of non-phosphate compound for use in the invention is described in detail hereinunder with reference to specific examples thereof given below; however, needless-to-say, the high-molecular additive of non-phosphate compound for use in the invention is not limited to these.

The non-phosphate compound is preferably a non-phosphate ester compound. However, the "non-phosphate ester compound" does not include phosphates, and is meant to include ester compounds except phosphates.

The polymer additive of non-phosphate compound includes polyester polymer (aliphatic polyester polymer, aromatic polyester polymer, etc.), and copolymer of polyester ingredient and other ingredient, etc. Preferred are aliphatic polyester polymer, aromatic polyester polymer; copolymer of polyester polymer (aliphatic polyester polymer, aromatic polyester polymer, etc.) and acrylic polymer; and copolymer of polyester polymer (aliphatic polyester polymer, aromatic polyester polymer, etc.) and styrenic polymer. More preferred are polyester compounds containing an aromatic ring as at least one copolymerization ingredient.

The aliphatic polyester-type polymers for use in the invention is one produced by reaction of a mixture of an aliphatic dicarboxylic acid having from 2 to 20 carbon atoms, and a diol selected from the group consisting of aliphatic diols having from 2 to 12 carbon atoms and alkyl ether diols having from 4 to 20 carbon atoms, and both ends of the reaction product may be as such, or may be blocked by further reaction with a monocarboxylic acid or a monoalcohol. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic acid having from 4 to 20 carbon atoms or an aromatic dicarboxylic acid having from 8 to 20 carbon atoms.

The aliphatic dicarboxylic acids having from 2 to 20 carbon atoms preferably for use in the film of the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

More preferred aliphatic dicarboxylic acids in these are malonic acid, succinic acid, maleic acid, fumaric acid, glutaric acid, adipic acid, azelaic acid, 1,4-cyclohexanedicarboxylic acid. Particularly preferred dicarboxylic acids are succinic acid, glutaric acid and adipic acid.

The diol used for the high-molecular additive are selected, for example, from aliphatic diols having from 2 to 20 carbon atoms, alkyl ether diols having from 4 to 20 carbon atoms.

Examples of the aliphatic dial having from 2 to 20 carbon atoms include an alkyldiol and an aliphatic diol. For example, an ethandiol, 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol (neopentyl glycol), 2,2-diethyl-1,3-propandiol (3,3-dimethylolpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, etc. One or more of these glycols may be used either singly or as combined mixture.

Specific examples of preferred aliphatic diols include an ethandiol, 1,2-propandiol, 1,3-propandiol, 1,2-butandiol, 1,3-butandiol, 2-methyl-1,3-propandiol, 1,4-butandiol, 1,5-pentandiol, 3-methyl-1,5-pentandiol, 1,6-hexandiol, 1,4-cyclohexandiol, 1,4-cyclohexandimethanol. Particularly preferred examples include ethandiol, 1,2-propandiol, 1,3-propandiol, 1,2-butandiol, 1,3-butandiol, 1,4-butandiol, 1,5-pentandiol, 1,6-hexandiol, 1,4-cyclohexandiol, 1,4-cyclohexanedimethanol.

Specific examples of preferred alkyl ether diols having from 4 to 20 carbon atoms are polytetramethylene ether glycol, polyethylene ether glycol and polypropylene ether glycol, and combinations of these. The average degree of polymerization is not limited in particular, and it is preferably from 2 to 20, more preferably 2 to 10, further preferably from 2 to 5, especially preferably from 2 to 4. As these examples, Carbowax resin, Pluronics resin and Niax resin are commercially available as typically useful polyether glycols.

In the invention, especially preferred is a high-molecular additive of which the terminal is blocked with an alkyl group or an aromatic group. The terminal protection with a hydrophobic functional group is effective against aging at high temperature and high humidity, by which the hydrolysis of the ester group is retarded.

Preferably, the polyester plasticizer in the invention is protected with a monoalcohol residue or a monocarboxylic acid residue in order that both ends of the polyester plasticizer are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tent-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol, benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

The high-molecular additive for use in the invention may be easily produced according to any of a thermal melt condensation method of polyesterification or interesterification of the above-mentioned dicarboxylic acid and diol and/or monocarboxylic acid or monoalcohol for terminal blocking, or according to an interfacial condensation method of an acid chloride of those acids and a glycol in an ordinary manner. The polyester additives are described in detail in Koichi Murai's "Additives, Their Theory and Application" (by Miyuki Publishing, first original edition published on Mar. 1, 1973). The materials described in JP-A 05-155809, 05-155810, 05-197073, 2006-259494, 07-330670, 2006-342227, 2007-003679 are also usable herein.

The aromatic polyester polymers are obtained by copolymerizing the above-mentioned polyester polymers with a monomer having an aromatic ring. The monomer having an aromatic ring is at least one monomer selected from aromatic dicarboxylic acids having from 8 to 20 carbon atoms, and aromatic diols having from 6 to 20 carbon atoms.

The aromatic dicarboxylic acids for use in the film of the invention having from 8 to 20 carbon atoms include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalene dicarboxylic acid and 2,6-naphthalene dicarboxylic acid etc. Preferable aromatic dicarboxylic acids are phthalic acid, terephthalic acid and isophthalic acid.

The aromatic diols having from 6 to 20 carbon atoms, not limited, include Bisphenol A, 1,2-hydroxybenzene, 1,3-hydroxybenzene, 1,4-hydroxybenzene, 1,4-dimethylolbenzene, and preferably include bisphenol A, 1,4-hydroxybenzene and 1,4-dimethylolbenzene.

In the invention, the aromatic polyester is combined with at least one of aromatic dicarboxylic acids or aromatic diols, and the combination is not specifically defined. Different types of the respective ingredients may be combined with no problem. In the invention, especially preferred are high-molecular-weight additives the terminal of which is blocked with an alkyl group or an aromatic group, as so mentioned in the above; and for the blocking, the above-mentioned method may be employed.

<Other Additives>

Any other additive than the non-phosphate compound may be added to the film of the invention. The additional additive includes a retardation regulator (retardation enhance, retardation reducer); a plasticizer such as phthalate, phosphate, etc.; a UV absorbent; an antioxidant; a matting agent, etc.

In the invention, as the retardation reducer, phosphate ester compounds and other compounds than non-phosphate compounds known as additive to cellulose acylate films can be widely employed.

The polymer-type retardation reducer may be selected from phosphate polyester polymers, styrenic polymers, acrylic polymers and their copolymers; and acrylic polymers and styrenic polymers are preferred. Preferably, the retardation reducer contains at least one polymer having a negative intrinsic birefringence such as styrenic polymer and acrylic polymer.

The low-molecular weight retardation reducer except non-phosphate compounds includes the following. These may be solid or oily. In other words, they are not specifically defined in point of the melting point or boiling point thereof. For example, there is mentioned mixing UV-absorbent materials having a melting point of 20° C. or less, or having a melting point of 20° C. or more, as well as mixing antiaging agents similarly. IR absorbent dyes are described in, for example, JP-A 2001-194522. The additive may be added in any stage of preparing the cellulose acylate solution (dope); and the additive may be added at the end of the dope preparation process in the final step for additive addition of the process. The amount of the material is not specifically defined so far as the material could exhibit its function.

The low-molecular retardation reducer of compounds except non-phosphate compounds is not specifically defined. For example, the compounds are described in detail in JP-A 2007-272177, paragraphs [0066] to [0085].

The compounds represented by a general formula (1) in JP-A 2007-272177, paragraphs [0066] to [0085] may be produced according to the following method.

The compounds of formula (1) in the patent publication can be produced by condensation of a sulfonyl chloride derivative and an amine derivative.

The compounds of a general formula (2) in JP-A 2007-272177 can be produced by dehydrating condensation of a carboxylic acid and an amine with a condensing agent (e.g., dicyclohexylcarbodiimide (DCC), etc.), or by substitution reaction between a carboxylic acid chloride derivative and an amine derivative.

The retardation reducer in the invention is preferably an Rth reducer from the viewpoint of realizing a favorable Nz factor. Of the retardation reducers, the Rth reducer includes, for example, acrylic polymers, styrenic polymers, and low-molecular-weight compounds of formulae (3) to (7). Of those, preferred are acrylic polymers and styrenic polymers; and more preferred are acrylic polymers.

The retardation reducing agent is added in an amount of preferably from 0.01 to 30% by mass of the cellulose resin, more preferably from 0.1 to 20% by mass of the cellulose resin, still more preferably from 0.1 to 10% by mass of the cellulose resin.

When the retardation reducing agent is added in an amount of at most 30% by mass, compatibility with the cellulose resin can be improved and whitening can be inhibited. When two or more retardation reducing agents are used, the sum amount of the agents is preferably within the above range.

(Plasticizer)

Many compounds known for a plasticizer of a cellulose acylate may be preferably used as a plasticizer in the invention. As the plasticizer, usable are phosphates or carboxylates. Examples of the phosphates include triphenyl phosphate (TPP) and tricresyl phosphate (TCP). The carboxylates are typically phthalates and citrates. Examples of the phthalates include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates include triethyl O-acetylcitrate (OACTE) and tributyl O-acetylcitrate (OACTB). Examples of other carboxylates include butyl oleate, methylacetyl ricinoleate, dibutyl sebacate, and various trimellitates. Preferred for use herein are phthalate plasticizers (DMP, DEP, DBP, DOP, DPP, DEHP). More preferred are DEP and DPP.

(Retardation Enhancer)

Preferably, the film of the invention contains at least one retardation enhancer in the low-substitution layer for expressing a desired retardation value. Not specifically defined, the retardation enhancer includes rod-like or discotic compounds, as well as the above-mentioned non-phosphate compounds exhibiting the ability of retardation enhancement. As the rod-like or discotic compounds, those having at least two aromatic rings are preferred for the retardation enhance.

The amount of the retardation enhancer of rod-shaped compound is preferably from 0.1 to 30 parts by mass, relative to 100 parts by mass of the cellulose acylate-containing polymer ingredient, more preferably from 0.5 to 20 parts by mass. Preferably, the amount of the discotic compound in the retardation enhancer is less than 3 parts by mass relative to 100 parts by mass of cellulose acylate, more preferably less than 2 parts by mass, even more preferably less than 1 part by mass.

A discotic compound is superior to a rod-shaped compound as an Rth retardation enhancer, and is therefore favorably used in ace where the film requires an especially large Rth retardation. Two or more different types of retardation enhancers may be used, as combined.

Preferably, the retardation enhancer has a maximum absorption in a wavelength range of from 250 to 400 nm, and preferably, it does not have substantial absorption in a visible light region.

Description will be given about the discotic compound. As the discotic compound, a compound having at least two aromatic rings can be employed.

In the specification, an "aromatic ring" includes an aromatic heteroring, in addition to an aromatic hydrocarbon ring.

The aromatic hydrocarbon ring is particularly preferably a 6-membered ring (that is, benzene ring).

Generally, the aromatic heteroring is an unsaturated heteroring. The aromatic heteroring is preferably a 5-membered ring, 6-membered ring or a 7-membered ring, more preferably a 5-membered ring or a 6-membered ring. Generally, the aromatic heteroring has the largest number of double bonds. As hetero atoms, a nitrogen atom, an oxygen atom and a sulfur atom are preferred, and a nitrogen atom is particularly preferred. Examples of the aromatic heteroring include a furan ring, a thiophene ring, a pyrrole ring, an oxazole ring, an iso-oxazole ring, a thiazole ring, an iso-thiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, a benzene ring, a condensed benzene ring, biphenol and a 1,3,5-triazine ring are used preferably, and, in particular, a 1,3,5-triazine ring is preferably used. Specifically, compounds, for example, disclosed in JP-A-2001-166144 are used preferably as a discotic compound.

Number of aromatic rings included in the retardation enhancer is preferably 2-20, more preferably 2-12, furthermore preferably 2-8, most preferably 2-6.

Bond relation of two aromatic rings can be classified into following cases (since an aromatic ring, a spiro bond can not be formed): (a) formation of a condensed ring, (b) formation of a direct bond by a single bond, and (c) formation of a bond via a linking group. The bond relation may be any one of (a)-(c).

Examples of the (a) condensed ring (a condensed ring of two or more of aromatic rings) include an indene ring, a naphthalene ring, an azulene ring, a fluorene ring, a phenanthrene ring, an anthracene ring, an acenaphthylene ring, an biphenylene ring, a naphthacene ring, a pyrene ring, an indole ring, an iso-indole ring, a benzofuran ring, a benzothiophene ring, an indolizine ring, a benzoxazole ring, a benzothiazole ring, a benzoimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxthine ring, a phenoxazine ring and a thianthrene ring. A naphthalene ring, an azulene ring, an indole ring, a benzoxazole ring, a benzothiazole ring, a benzoimidazole ring, benzotriazole ring and a quinoline ring are preferred.

The single bond of (b) is preferably a carbon-carbon bond between two aromatic rings. Two aromatic rings may be bonded by two or more of single bonds to form an aliphatic ring or a non-aromatic heteroring between the two aromatic rings.

The linking group of (c) also bonds, preferably, to carbon atoms of the two aromatic rings. The linking group is preferably an alkylene group, an alkenylene group, an alkynylene group, —CO—, —O—, —NH—, —S— or combinations thereof. Examples of the linking group composed of the combination are shown below. In this connection, the relation of right and left in the following examples of linking group may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—-O-alkylene-O—CO-alkylene-β
c13: —O—CO-alkylene-CO—O—
c14: —NH—CO-alkenylene-
c15: —O—CO-alkenylene- The aromatic ring and the linking group may have a substituent.

Examples of the substituent include a halogen atom (F, Cl, Br, I), a hydroxyl group, a carboxyl group, a cyano group, an amino group, a nitro group, a sulfo group, a carbamoyl group, a sulfamoyl group, an ureide group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic-substituted amino group, an aliphatic-substituted carbamoyl group, an aliphatic-substituted sulfamoyl group, an aliphatic-substituted ureide group and a non-aromatic heterocyclic group.

Number of carbon atoms of the alkyl group is preferably 1-8. A chain alkyl group is preferred to a cyclic alkyl group, and a strait-chain alkyl group is particularly preferred. The alkyl group may further have a substituent (for example, a hydroxyl group, a carboxyl group, an alkoxy group, an alkyl-substituted amino group). Examples of the alkyl group (including the substituted alkyl group) include a methyl group, an ethyl group, a n-butyl group, a n-hexyl group, a 2-hydroxyethyl group, a 4-carboxybutyl group, a 2-methoxyethyl group and 2-diethylaminoethyl group.

Number of carbon atoms of the alkenyl group is preferably 2-8. A chain alkenyl group is preferred to a cyclic alkenyl group, and a straight-chain alkenyl group is particularly preferred. The alkenyl group may further have a substituent. Examples of the alkenyl group include a vinyl group, an aryl group and a 1-hexenyl group.

Number of carbon atoms of the alkynyl group is preferably 2-8. A chain alkynyl group is preferred to a cyclic alkynyl group, and a straight-chain alkynyl group is particularly preferred. The alkynyl group may further have a substituent. Examples of the alkynyl group include an ethynyl group, a 1-butynyl group and a 1-hexynyl group.

Number of carbon atoms of the aliphatic acyl group is preferably 1-10. Examples of the aliphatic acyl group include an acetyl group, a propanoyl group and a butanoyl group.

Number of carbon atoms of the aliphatic acyloxy group is preferably 1-10. Example of the aliphatic acyloxy group include an acetoxy group.

Number of carbon atoms of the alkoxy group is preferably 1-8. The alkoxy group may further have an substituent (for example, an alkoxy group). Examples of the alkoxy group (including a substituted alkoxy group) include a methoxy group, an ethoxy group, a butoxy group and a methoxyethoxy group.

Number of carbon atoms of the alkoxycarbonyl group is preferably 2-10. Examples of the alkoxycarbonyl group include a methoxycarbonyl group and an ethoxycarbonyl group.

Number of carbon atoms of the alkoxycarbonylamino group is preferably 2-10. Examples of the alkoxycarbonylamino group include a methoxycarbonylamino group and an ethoxycarbonylamino group.

Number of carbon atoms of the alkylthio group is preferably 1-12. Examples of the alkylthio group include a methylthio group, an ethylthio group and an octylthio group.

Number of carbon atoms of the alkylsulfonyl group is preferably 1-8. Examples of the alkylsulfonyl group include a methanesulfonyl group and an ethanesulfonyl group.

Number of carbon atoms of the aliphatic amide group is preferably 1-10. Example of the aliphatic amide group includes an acetamide group.

Number of carbon atoms of the aliphatic sulfonamido group is preferably 1-8. Examples of the aliphatic sulfonamido group include a methane sulfonamido group, a butane sulfonamido group and a n-octane sulfonamido group.

Number of carbon atoms of the aliphatic-substituted amino group is preferably 1-10. Examples of the aliphatic-substituted amino group include a dimethylamino group, a diethylamino group and a 2-carboxyethylamino group.

Number of carbon atoms of the aliphatic-substituted carbamoyl group is preferably 2-10. Examples of the aliphatic-substituted carbamoyl group include a methylcarbamoyl group and a diethylcarbamoyl group.

Number of carbon atoms of the aliphatic-substituted sulfamoyl group is preferably 1-8. Examples of the aliphatic-substituted sulfamoyl group include a methylsulfamoyl group and a diethylsulfamoyl group.

Number of carbon atoms of the aliphatic-substituted ureide group is preferably 2-10. Example of the aliphatic-substituted ureide group includes a methylureide group.

Examples of the non-aromatic heterocyclic group include a piperidino group and a morphorino group.

Molecular weight of the retardation enhancer composed of the discotic compound is preferably 300-800.

A compound represented by following formula (I) is preferably used for the discotic compound.

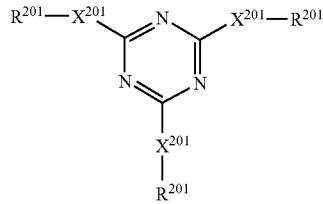

Formula (I)

In the above formula (I):

$R^{201}$ each independently represents an aromatic ring or a hetero ring having a substituent at any of the ortho-, meta- and para-positions.

$X^{201}$ each independently represents a single bond or —$NR^{202}$—. $R^{202}$ each independently represents a hydrogen atom, or a substituted or unsubstituted alkyl, alkenyl, aryl or heterocyclic group.

The aromatic ring represented by $R^{201}$ is preferably a phenyl ring or a naphtyl ring, particularly preferably a phenyl ring. The aromatic ring represented by $R^{201}$ may have at least one substituent in any one of substitution positions. For the example of the above-mentioned substituent, a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfoneamide group, a carbamoyl group, an alkyl substituted carbamoyl group, an alkenyl substituted carbamoyl group, an aryl substituted carbamoyl group, an amide group, an alkylthio group, an alkenylthio group, an arylthio group and an acyl group are included.

The hetero ring for $R^{201}$ is preferably aromatic. The aromatic hetero ring is generally an unsaturated hetero ring, and is preferably a hetero ring having maximum double bonds. The hetero ring is preferably a 5-membered ring, a 6-membered ring or a 7-membered ring, more preferably a 5-membered ring or a 6-membered ring, most preferably a 5-membered ring. The hetero atom constituting the hetero ring is preferably a nitrogen atom, a sulfur atom or an oxygen atom, more preferably a nitrogen atom. The aromatic hetero ring is especially preferably a pyridine ring (as the heterocyclic group, a 2-pyridyl or 4-pyridyl group). The heterocyclic group may have a substituent. Examples of the substituent for the heterocyclic group may be the same as those mentioned hereinabove for the substituent of the aryl moiety.

The heterocyclic group in a case where $X^{201}$ is a single bond is preferably a heterocyclic group having a chemical bond at the nitrogen atom. The heterocyclic group having a chemical bond at the nitrogen atom is preferably a 5-membered ring, a 6-membered ring or a 7-membered ring, more preferably a 5-membered ring or a 6-membered ring, most preferably a 5-membered ring. The heterocyclic group may have plural nitrogen atoms. The heterocyclic group may have any other hetero atom (e.g., O, S) than the nitrogen atom. Examples of the heterocyclic group having a chemical bond at the nitrogen atom are shown below.

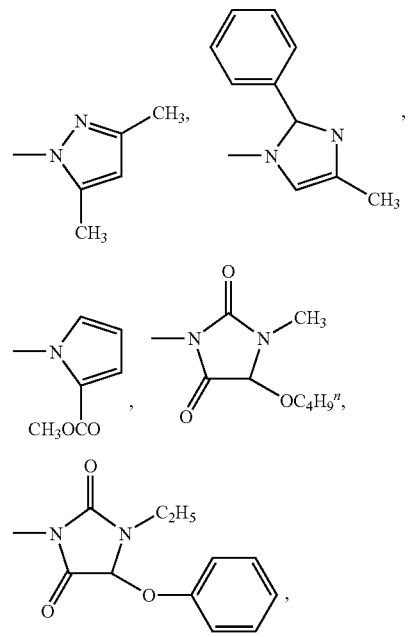

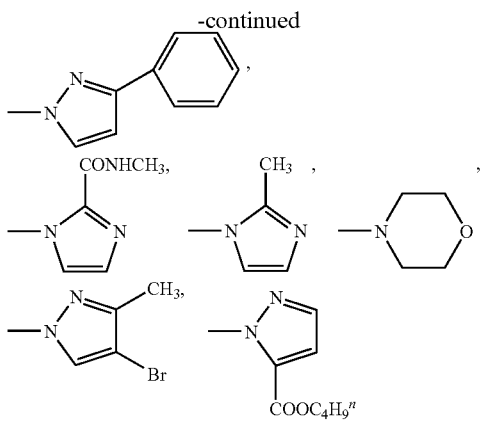

The alkyl group represented by $R^{202}$ may be a cyclo alkyl group or a chain alkyl group, preferably a chain alkyl group. A straight chain alkyl group is more preferred to a branched chain alkyl group. Number of the carbon atoms of the alkyl group is preferably 1-30, more preferably 1-20, further preferably 1-10, further more preferably 1-8, and most preferably 1-6. The alkyl group may have a substituent. An example of the substituent includes a halogen atom, an alkoxy group (for example, a methoxy group, an ethoxy group) and an acyloxy group (for example, an acryloxy group, a methacryloxy group).

The alkenyl group represented by $R^{202}$ may be a cyclo alkenyl group or a chain alkenyl group, preferably a chain alkenyl group. A straight chain alkenyl group is more preferred to a branched chain alkyl group. Number of the carbon atoms of the alkyl group is preferably 2-30, more preferably 2-20, further preferably 2-10, further more preferably 2-8, and most preferably 2-6. The alkenyl group may have a substituent. As the substituents, those for the above-mentioned alkyl group can be used.

The aromatic ring group and heterocyclic group represented by $R^{202}$ and their preferable groups are as described in $R^{201}$ above. The aromatic ring group and the heterocyclic group may have a substituent further, and examples of the substituent are the same as those for $R^{201}$.

The compounds of formula (I) may be produced according to known methods, for example, the method described in JP-A 2003-344655. The retardation enhancer is described in detail in Disclosure Bulletin No. 2001-1745, page 49.

As the retardation enhancer in the invention, also usable are polymer additives like the above-mentioned low-molecular compounds. In the invention, the above-mentioned non-phosphate polymers may serve also as the retardation enhancer. As the polymer retardation enhancer of the above-mentioned non-phosphate polymer, preferred are the above-mentioned aromatic polyester polymers and copolymers of the aromatic polyester polymer and any other resin.

The retardation enhancer in the invention is preferably an Re enhancer from the viewpoint of efficiently enhancing Re and realizing a suitable Nz factor. Of the retardation enhancers, the Re enhancer includes, for example, discotic compounds and rod-shaped compounds.

The cellulose acyalete laminate film of the invention may contain any other additives if needs. The other additives include an antiaging agent, a UV absorbent, a release promoter, a matting agent, a lubricant, the plasticizer mentioned above, etc.

(Antiaging Agent)

Any known antiaging agent (antioxidant) may be added to the cellulose acylate laminate film in the invention. For example, phenolic or hydroquinone-based antioxidants may be added, including 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol) 2,5-di-tert-butylhydroquinone, pentaerythrityl tetrakis[3-(3,5-di-tert-butyl-4-hydroxyphenyl)propionate], etc. Also preferred are phosphorus-containing antioxidants such as tris(4-methoxy-3,5-diphenyl)phosphite, tris(nonylphenyl)phosphite, tris(2,4-di-tert-butylphenyl)phosphite, bis(2,6-di-tent-butyl-4-methylphenyl)pentaerythritol diphosphite, bis(2,4-di-tert-butylphenyl)pentaerythritol diphosphite, etc. The amount of the antiaging agent to be added may be from 0.05 to 5.0 parts by mass relative to 100 parts by mass of the cellulose acylate resin.

(UV Absorbent)

From the viewpoint of preventing the deterioration of polarizers and liquid crystals, a UV absorbent is favorably added to the cellulose acylate laminate film in the invention. Preferably, the UV absorbent has an excellent UV-absorbing capability at a wavelength of at most 370 nm, and has little absorption of visible light having a wavelength of at least 400 nm, from the viewpoint of good liquid crystal display capability. Preferred examples of the UV absorbent for use in the invention include hindered phenol compounds, hydroxybenzophenone compounds, benzotriazole compounds, salicylate compounds, benzophenone compounds, cyanoacrylate compounds, nickel complex compounds, etc. Examples of the hindered phenol compounds include 2,6-di-tert-butyl-p-cresol, pentaerythrityl tetrakis[3-(3,5-di-tert-butyl-4-hydroxyphenyl)propionate], N,N'-hexamethylenebis(3,5-di-tert-butyl-4-hydroxy-hydrocinn amide), 1,3,5-trimethyl-2,4,6-tris (3,5-di-tert-butyl-4-hydroxybenzyl)benzene, tris-(3,5-di-tert-butyl-4-hydroxybenzyl)isocyanurate, etc. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinn amide), 1,3,5-trimethyl-2,4, 6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythrityl tetrakis[3-(3, 5-di-tert-butyl-4-hydroxyphenyl)propionate], etc. The amount of the UV absorbent to be added is preferably from 1 ppm to 1.0%, more preferably from 10 to 1000 ppm in terms of the ratio by mass thereof in the entire cellulose acylate laminate film.

(Release Promoter)

Preferably, the film of the invention contains a release promoter from the viewpoint of further promoting the releasability thereof. The release promoter may be in the film, for example, in a ratio of from 0.001 to 1% by weight. Preferably, the content is at most 0.5% by weight since the releasing agent hardly separates from the film; and also preferably, the content is at least 0.005% by weight since a required release reduction effect may be realized. Accordingly, preferably, the content is from 0.005 to 0.5% by weight, more preferably from 0.01 to 0.3% by weight. The release promoter may be any known one, including organic and inorganic acid compounds, surfactants, chelating agents, etc. Above all, polycarboxylic acids and their esters are effective; and ethyl esters of citric acid are more effective.

Preferably, the film of the invention contains the release promoter in the layer B stated below.

(Matting Agent)

In the film of the invention, at least one high-substitution layer preferably contains a matting agent from the view point of lubricity of the film and stable production. The matting agent may be an inorganic compound or an organic compound.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, tin-antimony oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 18, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called direct addition method, in which the ingredients may be on-line mixed by screw kneading. Concretely, preferred is a static mixer such as an in-line mixer. As the in-line mixer, for example, preferred is a static mixer, SWJ (Toray's static tubular mixer, Hi-Mixer, by Toray Engineering). Regarding the mode of in-line addition, JP-A 2003-053752 describes an invention of a method for producing a cellulose acylate film wherein, for the purpose of preventing concentration unevenness and particle aggregation, the distance L between the nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A 2003-014933 discloses an invention of providing a retardation film which is free from a trouble of additive bleeding and a trouble of interlayer peeling and which has good lubricity and excellent transparency; and regarding the method of adding additives to the film, the patent reference says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

When the film of the invention has a structure of skin A/core/skin B, the film preferably contains a matting agent in at least one of the skin A layer and the skin B layer for the purpose of enhancing the scratch resistance of the film by reducing the friction coefficient on the film surface, and for the purpose of preventing the film that is wide and long from being creaked and folded while it is rolled up. More preferably, a matting agent is added to both the skin A layer and the skin B layer of the film for the purpose of more effectively enhancing the scratch resistance of the film and preventing the film from being creaked.

In the film of the invention, the matting agent does not increase the haze of the film so far as a large amount of the agent is not added to the film. In fact, when the film containing a suitable amount of a matting agent is used in LCD, the film hardly brings disadvantages of contract reduction and bright spot formation. Not too small amount, the matting agent in the film can realize the creaking resistance and the scratch resistance of the film. From these viewpoints, the matting agent content is preferably from 0.01 to 5.0% by weight, more preferably from 0.03 to 3.0% by weight, even more preferably from 0.05 to 1.0% by weight.

(Haze)

The cellulose acylate laminate film of the invention preferably has a haze of less than 0.20%, more preferably less than 0.15%, particularly preferably less than 0.10%. Having a haze of less than 0.20%, the film can improve contrast ratio of a liquid crystal display device incorporating it and the transparency of the film is enough high to use as an optical film.

[Optical Properties of Film of the Invention]

(Re, Rth)

The in-plane retardation at a wavelength of 550 nm, Re(550), of the film of the invention is the same as or larger than the in-plane retardation at a wavelength of 440 nm, Re(440), thereof; and preferably, Re(550) is larger than Re(440). Having the wavelength dispersion characteristics of retardation, the film of the invention is, when incorporated in a liquid crystal display device, capable of solving the problem of color shift in oblique observation of the display panel at the time of black level of display.

Preferably, the thickness-direction retardation at a wavelength of 550 nm, Rth(550) of the film of the invention is the same as or larger than the thickness-direction retardation at a wavelength of 440 nm, Rth(440) thereof, from the viewpoint of facilitating the resolution of the problem of color shift; and more preferably, Rth(550) is larger than Rth(440) from the viewpoint of more facilitating the resolution of the problem of color shift.

Preferably, the film of the invention is a biaxial optical compensatory film.

The biaxial optical compensatory film means that nx, ny and nz of the optical compensatory film (in which nx means the in-plane refractive index of the film in the slow-axis direction, ny means the in-plane refractive index in the direction perpendicular to nx, and nz means the refractive index in the direction perpendicular to nx and ny) all differ from each other. More preferably, in the invention, nx>ny>nz.

The film of the invention exhibiting biaxial optical properties is preferred in point of solving the problem of color shift when the film is incorporated in a liquid crystal display device, especially in a VA-mode liquid crystal display device and when the display panel is observed in oblique directions.

Preferably, the wavelength dispersion characteristics of the in-plane retardation Re and the thickness-direction retardation Rth of the film of the invention are higher at a longer wavelength of visible light.

Visible light concretely has a wavelength of from 380 to 780 nm; and preferably, the film of the invention has larger Re and Rth at a longer wavelength.

When the film of the type is incorporated in a liquid crystal display device, it can more effectively reduce the color shift in oblique observation of the display panel.

When the film of the invention is used as a retardation film, its retardation, Re and Rth may be suitably determined depending on the function of the optical film itself and on the design of the liquid crystal cell to which the film is applied. In general, it is preferable that the in-plane retardation at a wavelength of 590 NM, Re, satisfies 25 nm≤|Re|≤100 nm; and the thickness-direction retardation at a wavelength of 650 nm, Rth, satisfies 50 nm≤|Rth|≤250 nm from the viewpoint of applicability to a liquid crystal display as a retardation film for optical compensation. More preferably, 30 nm≤|Re|≤80 nm, even more preferably 35 nm≤|Re|≤70 nm. Also preferably, 70 nm≤|Rth|≤240 nm, more preferably 90 nm≤|Rth|≤230 nm.

Re($\lambda$) and Rth($\lambda$) represent, herein, the retardation in the plane and the retardation in the thickness direction, respectively, at a wavelength of $\lambda$. Re($\lambda$) is measured with KOBRA 21ADH or WR (by Oji Scientific Instruments) while allowing light having the wavelength of $\lambda$ nm to enter in the normal direction of a film.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re($\lambda$) of the sample is measured at 6 points in all thereof, up to +50° relative to the normal line direction of the sample at intervals of 10°, by applying a light having a wavelength of $\lambda$ nm from the inclined direction of the sample.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (A) and (B).

The mean refractive index may be used values described in catalogs for various types of optical films. When the mean refractive index has not known, it may be measured with Abbe refractometer. The mean refractive index for major optical film is described below: cellulose acylate (1.48), cycloolefin polymer (1.52), polycarbonate (1.59), polymethylmethacrylate (1.49), polystyrene (1.59).

By inputting the value of these average refraction indices and thickness, KOBRA 21ADH or WR computes nx, ny, nz. From the computed nx, ny, nz, Nz=(nx−nz)/(nx−ny) is computed further.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (A)$$

The above Re($\theta$) represents the retardation in a direction that inclines in the degree of $\theta$ from the normal direction; and d is a thickness of the film.

$$Rth = \{(nx+ny)/2 - nz\} \times d \quad (B)$$

In this, the mean refractive index n is needed as a parameter, and it is measured with an Abbe refractiometer (Atago's Abbe Refractiometer 2-T).

(Nz Factor)

Nz factor may be suitably determined depending on the function of the optical film itself and on the design of the liquid crystal cell to which the film is applied. The film of the invention preferably has an Nz factor represented by the following formula (C) is at most 7, more preferably at most 5.5, particularly preferably at most 4.5. A preferred embodiment of the invention is capable of improving wavelength dispersion and lowering haze even when the Nz factor is low.

$$Nz \text{ factor} = (Rth/Re) + 0.5. \quad (C)$$

(Layer Constitution of Cellulose Acylate Film)

The film of the invention comprises a low-substitution layer that contains a cellulose acylate satisfying the above formula (1) and a non-phosphate compound, and as laminated on at least one face of the low-substitution layer, a high-substitution layer that contains a cellulose acylate satisfying the above formula (2). In each layer, the degree of acyl substitution of the cellulose acylate may be uniform, or different types of cellulose acylates may be in one layer as combined; however, preferably, the degree of acyl substitution of the cellulose acylate in the individual layers is all constant from the viewpoint of regulating the optical properties of the film.

In case where the film of the invention is produced according to a solution casting method, preferably, the layer in contact with the support (hereinafter this may be referred to as a skin B layer) is the high-substitution layer and the other layer is the low-substitution layer, from the viewpoint of improving the releasability of the film from the support in the solution casting method.

Preferably, the film of the invention has a three or more multi-layered laminate structure from the viewpoint of securing the dimensional stability and reducing the curling in environmental humidity/temperature change. Also preferably, the high-substitution layer is on both faces of the low-substitution layer from the viewpoint of broadening the latitude in the step of realizing the desired optical properties of the film to be an optical compensatory film. More preferably, the film of the invention has a three or more multi-layered laminate structure, in which all the cellulose acylate contained in at least one internal layer is the cellulose acylate satisfying the above formulae (3) and (4), and all the cellulose acylate contained in the two surface layers is the cellulose acylate satisfying the above formulae (5) and (6). In the film of the invention having a three or more multi-layered laminate structure, the surface layer not in contact with the support in the film formation may be referred to as a skin A layer.

Preferably, the film of the invention has a three-layered structure of skin B layer/core layer/skin A layer. The film of the invention having a three-layered structure may have a constitution of high-substitution layer/low-substitution layer/high-substitution layer, or a constitution of low-substitution layer/high-substitution layer/low-substitution layer; but preferably, the film has a constitution of high-substitution layer/low-substitution layer/high-substitution layer from the viewpoint of the releasability of the film from the support in solution-casting film formation and from the viewpoint of the dimensional stability of the film.

In the film of the invention having a three-layered structure, preferably, the cellulose acylate to be in both surface layers is one having the same degree of acyl substitution from the viewpoint of the production cost and the dimensional stability of the film and from the viewpoint of reducing the curling of the film in environmental humidity/heat change.
(Film Thickness)

Preferably, the mean thickness of the core layer of the film of the invention is from 30 to 100 μm, more preferably from 30 to 80 μm, even more preferably from 30 to 70 μm. When the core layer has a mean thickness of at least 30 μm, the handlability of the film is favorably good in producing the film as a web. When the core layer has a mean thickness of at most 70 μm, the film may readily follow the ambient humidity change and may keep its optical properties.

In the film of the invention, the mean thickness of at least one high substitution layer is preferably from 0.2% to less than 25% of the mean thickness of the low substitution layer. When it is at least 0.2%, then the releasability of the film may be enough, and the film may have reduced troubles of streaky surface unevenness, thickness unevenness and uneven optical properties of the film; and when less than 25%, the core layer may effectively exhibit its optical expressibility and the laminate film can have satisfactory optical properties. The mean thickness of at least one high substitution layer is more preferably from 0.5 to 15% of the mean thickness of the low substitution layer, even more preferably from 1.0 to 10% of the mean thickness of the low substitution layer. Still more preferably, the mean thickness of both the high substitution layer and the low substitution layer is from 0.2% to less than 25% of the mean thickness of the core layer.

Preferably in the film of the invention, the mean thickness of the low-substitution layer is from 30 to 100 μm, and the mean thickness of at least one high-substitution layer is from 0.2% to less than 25% of the mean thickness of the low-substitution layer, from the viewpoint of the wavelength dispersion characteristics of retardation of the film. More preferably, the mean thickness of the low-substitution layer is from 30 to 100 μm, and the mean thickness of both high-substitution layers is from 0.2% to less than 25% of the mean thickness of the low-substitution layer.

In case where the film of the invention has a three or more multi-layered structure, preferably, the thickness of the low-substitution layer (preferably, the thickness of the core layer) is from 30 to 70 μm, more preferably from 30 to 60 μm, even more preferably from 30 to 50 μm.

In case where the film of the invention has a three or more multi-layered structure, preferably, the thickness of the high-substitution layer (preferably, the thickness of the surface layer on both sides of the film) is from 0.5 to 20 μm, more preferably from 0.5 to 10 μm, even more preferably from 0.5 to 3 μm.

The film of the invention may have a three-layered laminate structure, in which the inner layer (core layer) may be the above-mentioned low-substitution layer and the surface layers (skin B layer and skin A layer) may be the above-mentioned high-substitution layers. Preferably, the thickness of the skin B layer and the skin A layer is smaller than that of the core layer. The preferred condition of the thickness of the surface layers may be the same as that in the film of the invention having a three or more multi-layered structure.
(Film Width)

The film width of the film of the invention is preferably from 700 to 3000 mm, more preferably from 1000 to 2800 mm, particularly preferably from 1500 to 2500 mm.

The film of the invention is also preferably the film width thereof is from 700 to 3000 mm and ΔRe is at most 10 nm.
[Method for Producing Cellulose Acylate Laminate Film]

The method for producing the cellulose acylate laminate film of the invention (hereinafter this may be referred to as the production method of the invention) is characterized by comprising a step of forming a cellulose acylate laminate film by sequential casting or simultaneous co-casting of a cellulose acylate solution for low-substitution layer that contains a cellulose acylate satisfying the following formula (1) and a non-phosphate compound, and a cellulose acylate solution for high-substitution layer that contains a cellulose acylate satisfying the following formula (2), and a step of stretching the cellulose acylate laminate film at a temperature of not lower than (Tg−30° C.) under the condition that the film contains the residual solvent in an amount of at least 5% by mass of the film, wherein Tg means the glass transition temperature of the cellulose acylate laminate film:

$$2.0 < Z1 < 2.7, \quad (1)$$

wherein Z1 means the total degree of acyl substitution of the cellulose acylate of the low-substitution layer, $$2.7 < Z2, \quad (2)$$

wherein Z2 means the total degree of acyl substitution of the cellulose acylate of the high-substitution layer.

The production method of the invention is described in detail hereinunder.

Preferably, the cellulose acylate laminate film is formed according to a solvent casting method. For production examples for cellulose acylate film according to a solvent casting method, referred to are U.S. Pat. Nos. 2,336,310, 2,367,603, 2,492,078, 2,492,977, 2,492,978, 2,607,704, 2,739,069 and 2,739,070, British Patents 640731 and 736892, JP-B 45-4554 and 49-5614, JP-A 60-176834, 60-203430 and 62-115035. The cellulose acylate film may be stretched. For the method and the condition for stretching treatment, referred to are, for example, JP-A 62-115035, 4-152125, 4-284211, 4-298310, 11-48271.
[Casting Method]

The solution casting method includes a method of uniformly extruding a prepared dope through a pressure die onto a metal support, a doctor blade method of regulating the thickness of the dope once cast on a metal support, with a blade, and a method with a reverse roll coater of regulating the thickness with a reverse-rotating roll. Preferred is the method with a pressure die. The pressure die includes a coat hanger-type die, a T-die, etc. Any of these is favorably used herein. Apart from the methods mentioned herein, any other various known methods of forming a cellulose triacetate solution into films are also employable. In consideration of the difference in the boiling point of the solvent to be used, the conditions may be set, and the same advantages as in the reference publications can be attained here.

The film of the invention is produced in a process comprising a step of forming a film by applying the cellulose acylate solution (casting dope) for low-substitution layer that contains a cellulose acylate satisfying the above formula (1) and a non-phosphate compound, and the cellulose acylate solution for high-substitution layer that contains a cellulose acylate satisfying the above formula (2) onto a support, and a step of stretching the resulting film.

In the production method of the invention, preferably, the viscosity at 25° C. of the cellulose acylate solution for low-substitution layer is higher by at least 10% than the viscosity at 25° C. of the cellulose acylate solution for high-substitution layer, from the viewpoint of the cross-direction distribution of the laminate film layers and of the aptitude for production of the laminate film.

[Co-Casting]

For formation of the film of the invention, preferably employed is a laminate casting method of a co-casting method, a sequential casting method, a coating method or the like. More preferred is a simultaneous co-casting method from the viewpoint of stable production and production cost reduction.

Figure 2:
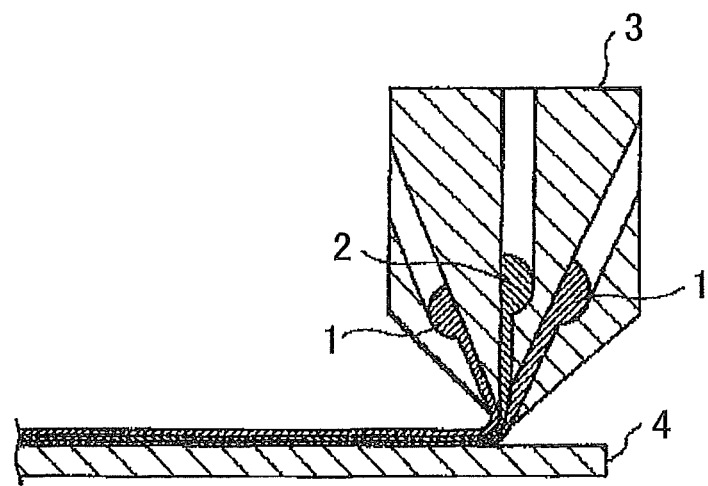
FIG. 2 is an outline view showing one example of producing a three-layered cellulose acylate laminate film by simultaneous co-casting through a co-casting die.

In case where the film of the invention is formed according to a co-casting method or a sequential casting method, first prepared is a cellulose acetate solution (dope) for each layer. In the co-casting method (superimposition simultaneous casting), casting dopes to be the constitutive layers (three or more layers) are extruded out through a casting Giesser die of simultaneously extruding the dopes through the respective slits onto a casting support (band or drum), and simultaneously cast thereon, and then peeled off from the support at a suitable time to give a film. FIG. 2 is a cross-sectional view showing the condition of simultaneous extrusion and casting of a surface layer dope 1 and core layer dopes 2 onto a casting support 4 through a co-casting Giesser die 3, thereby forming three layers on the support.

In the sequential casting method, a casting dope for the first layer is first extruded out and cast through a casting Giesser die onto a casting support, and after it is dried or not, a casting dope for the second layer is extruded out and cast onto it through a casting Giesser die, and in that manner, if desired, other dopes are cast and laminated on the previous layer up to be three or more layers, and at a suitable time, the resulting laminate is peeled off from the support and dried to be a film. In the coating method, in general, a film of the core layer is formed according to a solution casting method, then a coating liquid to be the surface layer is prepared, and using a suitable coating unit, the coating liquid is applied onto the core film on one side thereof at a time or on both sides simultaneously, and dried to give a laminate-structured film.

As the endlessly running metal support for use in producing the film of the invention, usable is a drum of which the surface is mirror-finished by chromium plating, or a stainless belt (band) of which the surface is mirror-finished by polishing. One or more pressure dies may be arranged above the metal support. Preferably, one or two pressure dies are arranged. In case where two or more pressure dies are arranged, the dope to be cast may be divided into portions suitable for the individual dies; or the dope may be fed to the die at a suitable proportion via a plurality of precision metering gear pumps. The temperature of the cellulose acylate solution to be case is preferably from −10 to 55° C., more preferably from 25 to 50° C. In this case, the solution temperature may be the same throughout the entire process, or may differ in different sites of the process. In case where the temperature differs in different sites, the dope shall have the desired temperature just before cast.

[Stretching Treatment]

The production method of the invention includes a step of stretching the formed cellulose acylate laminate film at a temperature of not lower than (Tg−30° C.) under the condition that the film contains the residual solvent in an amount of at least 5% by mass of the film. As described in the above, the optical compensatory film of the invention is characterized by having improved wavelength dispersion characteristics of retardation; and the stretching treatment makes it possible to impart the optical property to the stretched film and to impart the desired retardation thereto. The stretching direction of the cellulose acylate film may be preferably any of the film traveling direction or the direction perpendicular to the film traveling direction (cross direction). More preferably, the film is stretched in the direction perpendicular to the film traveling direction (cross direction) from the viewpoint of the subsequent process of using the film for producing a polarizer.

The method of stretching in the cross direction is described, for example, in JP-A 62-115035, 4-152125, 4-284211, 4-298310, 11-48271. For the machine-direction stretching, for example, the speed of the film conveyor rollers is regulated so that the film winding speed could be higher than the film peeling speed whereby the film may be stretched. For the cross-direction stretching, the film is conveyed while held by a tenter at the sides thereof and the tenter width is gradually broadened, whereby the film can be stretched. After dried, the film may be stretched with a stretcher (preferably for monoaxial stretching with a long stretcher).

The draw ratio in stretching of the film of the invention is preferably from 5% to 200%, more preferably from 10% to 100%, even more preferably from 20% to 50%.

In case where the cellulose acylate film is used as a protective film for a polarizing element, the transmission axis of the polarizing element must be in parallel to the in-plane slow axis of the cellulose acylate film so as to prevent the light leakage in oblique directions to the polarizer. The transmission axis of the roll film-type polarizing element that is produced continuously is generally parallel to the cross direction of the roll film, and therefore, in continuously sticking the roll film-type polarizing element and a protective film of a roll film-type cellulose acylate film, the in-plane slow axis of the roll film-type protective film must be parallel to the cross direction of the film. Accordingly, the film is preferably stretched to a larger extend in the cross direction. The stretching treatment may be attained during the course of the film formation process, or the wound film may be unwound and stretched. In the production method of the invention, the film is stretched while it contains the residual solvent therein, and therefore the film is preferably stretched during the course of the film formation process.

[Drying]

Preferably, the production method of the invention includes a step of drying the cellulose acylate laminate film and a step of stretching the dried cellulose acylate laminate film at a temperature not lower than (Tg−10° C.), from the viewpoint of enhancing the retardation of the film.

For drying the dope on a metal support in production of a cellulose acylate film, generally employable is a method of applying hot air to the surface of the metal support (drum or belt), or that is, on the surface of the web on the metal support; a method of applying hot air to the back of the drum or belt; or a back side liquid heat transfer method that comprises contacting a temperature-controlled liquid with the opposite side of the dope-cast surface of the belt or drum, or that is, the back of the belt or drum to thereby heat the belt or drum by heat transmission to control the surface temperature thereof.

Preferred is the backside liquid heat transfer method. The surface temperature of the metal support before the dope is cast thereon may be any degree so far as it is not higher than the boiling point of the solvent used in the dope. However, for promoting the drying or for making the dope lose its flowability on the metal support, preferably, the temperature is set to be lower by from 1 to 10° C. than the boiling point of the solvent having the lowest boiling point of all the solvents in the dope. In case where the cast dope is peeled off after cooled but not dried, then this shall not apply thereto.

For controlling the thickness of the film, the solid concentration in the dope, the slit gap of the die nozzle, the extrusion pressure from the die, and the metal support speed may be suitably regulated so that the formed film could have a desired thickness.

Produced in the manner as above, the length of the cellulose acylate film is preferably from 100 to 10000 m per roll, more preferably from 50 to 7000 m, even more preferably from 1000 to 6000 m. In winding the film, preferably, at least one edge thereof is knurled, and the knurling width is preferably from 3 mm to 50 mm, more preferably from 5 mm to 30 mm, and the knurling height is preferably from 0.5 to 500 μm, more preferably from 1 to 200 μm. This may be one-way or double-way knurling.

In general, in large-panel display devices, contrast reduction and color shift may be remarkable in oblique directions; and therefore the film of the invention is especially suitable for use in large-panel display devices. In case where the film of the invention is used as an optical compensatory film for large-panel liquid crystal display devices, for example, the film is shaped to have a width of at least 1470 mm. The optical compensatory film of the invention includes not only film sheets cut to have a size that may be directly incorporated in liquid crystal display devices but also long films continuously produced and rolled up into rolls. The optical compensatory film of the latter embodiment is stored and transported in the rolled form, and is cut into a desired size when it is actually incorporated into a liquid crystal display device or when it is stuck to a polarizing element or the like. The long film may be stuck to a polarizing element formed of a long polyvinyl alcohol film directly as they are, and then when this is actually incorporated into a liquid crystal display device, it may be cut into a desired size. One embodiment of the long optical compensatory film rolled up into a roll may have a length of 2500 m/roll or more.

[Polarizer]

The invention also relates to a polarizer comprising at least one film of the invention.

Preferably, the polarizer of the invention comprises a polarizing element and the film of the invention on one face of the polarizer. Like that of the optical compensatory film of the invention, the embodiment of the polarizer of the invention may include not only polarizers in the form of film sheets cut to have a size that may be directly incorporated in liquid crystal display devices but also polarizers in the form of long films continuously produced and rolled up into rolls (for example having a length of at least 2500 m/roll or at least 3900 m/roll). For use in large-panel liquid crystal display devices, the width of the polarizer is preferably at least 1470 mm as so mentioned in the above.

The concrete constitution of the polarizer of the invention is not specifically defined, for which, therefore, any known constitution is employable. For example, the constitution of FIG. 6 in JP-A 2008-262161 is employable.

[Liquid Crystal Display Device]

The invention also relates to a liquid crystal display device comprising the polarizer of the invention.

The liquid crystal display device of the invention is a liquid crystal display device, preferably an IPS, OCB or VA-mode liquid crystal display device comprising a liquid crystal cell and a pair of polarizers arranged on both sides of the liquid crystal cell, in which at least one of the polarizers is the polarizer of the invention.

The concrete constitution of the liquid crystal display device of the invention is not specifically defined, for which, therefore, any known constitution is employable. One example of the constitution is in FIG. 1. The constitution of FIG. 2 in JP-A 2008-262161 is also preferably employable herein.

EXAMPLES

The invention is described more concretely with reference to the following Examples. In the following Examples, the materials, the reagents and the substances used, their amount and ratio, the details of the treatment and the treatment process may be suitably modified or changed not overstepping the sprit and the scope of the invention. Accordingly, the invention should not be imitatively interpreted by the Examples mentioned below.

(Preparation of Cellulose Acylate)

According to the method described in JP-A 10-45804 and 08-231761, a cellulose acylate was produced, and its degree of substitution was measured. Concretely, as a catalyst, sulfuric acid was added in an amount of 7.8 parts by mass relative to 100 parts by mass of cellulose, and a carboxylic acid as a material for the acyl group was added for acylation at 40° C. In this process, the type and the amount of the carboxylic acid were controlled to thereby control the type and the degree of acyl substitution. After the acylation, the product was ripened at 40° C. The low-molecular-weight ingredient of the cellulose acylate was washed away with acetone.

(Preparation of Cellulose Acylate Solutions "C01" to "C20" for Low-Substitution Layer)

The following composition was put into a mixing tank and stirred to dissolve the ingredients, thereby preparing a cellulose acylate solution. The amount of the solvent (methylene chloride and methanol) was suitably controlled so that the solid concentration in the cellulose acylate solution could be as in Table 1 below.

| | |
|---|---|
| Cellulose acetate (degree of substitution 2.45) | 100.0 mas. pts. |
| Compound A | 18.5 mas. pts. |
| Methylene chloride | 365.5 mas. pts. |
| Methanol | 54.6 mas. pts. |

The other cellulose acylate solutions for low-substitution layer were prepared in the same manner as that for "C01", for which, however, the type of the acyl group and the degree of acyl substitution of cellulose acylate, and the amount and the type of the additives were changed as in Table 1 below. The solid concentration and the viscosity of the thus-obtained cellulose acylate solutions for low-substitution layer are shown in Table 1 below.

TABLE 1

| Solution No. | Cellulose Acylate Degree of Substitution | (mas. pt.) | Additive 1 Compound | (mas. pt.) | Additive 2 Compound | (mas. pt.) | Solution Concentration (mas. %) | Viscosity (Pa·s) |
|---|---|---|---|---|---|---|---|---|
| C01 | 2.45 | 100 | A | 18.5 | — | — | 22 | 60 |
| C02 | 2.45 | 100 | A | 15 | — | — | 22 | 65 |
| C03 | 2.45 | 100 | A | 20 | — | — | 22 | 55 |
| C04 | 2.45 | 100 | A | 18.5 | (I-2) | 1.5 | 22 | 55 |
| C05 | 2.45 | 100 | A | 18.5 | (I-2) | 3 | 22 | 50 |
| C06 | 2.45 | 100 | B | 20 | — | — | 22 | 60 |
| C07 | 2.45 | 100 | C | 20 | — | — | 22 | 60 |
| C08 | 2.55 | 100 | A | 18.5 | — | — | 22 | 60 |
| C09 | 2.35 | 100 | A | 18.5 | — | — | 22 | 60 |
| C10 | 2.45 | 100 | TPP | 11 | BDP | 7.5 | 22 | 60 |
| C11 | 2.79 | 100 | A | 18.5 | — | — | 22 | 60 |
| C12 | 2.45 | 100 | D | 19 | — | — | 22 | 60 |
| C13 | 2.45 | 100 | D | 15 | — | — | 22 | 65 |
| C14 | 2.45 | 100 | E | 20 | — | — | 22 | 55 |
| C15 | 2.45 | 100 | E | 15 | — | — | 22 | 65 |
| C16 | CAP 2.45 | 100 | D | 19 | — | — | 22 | 55 |
| C17 | 2.45 | 100 | D | 19 | (I-2) | 2 | 22 | 60 |
| C18 | 2.45 | 100 | D | 19 | (I-2) | 2.5 | 22 | 60 |
| C19 | CAP 2.1 | 100 | F | 25 | — | — | 22 | 50 |
| C20 | CAP 2.1 | 100 | F | 25 | — | — | 22 | 50 |

In Table 1 above, Compound A is terephthalic acid/phthalic acid/adipic acid/succinic acid/ethylene glycol copolymer (copolymerization ratio=22.5/2.5/10/15/50 [mol. %]). Compound B is terephthalic acid/phthalic acid/adipic acid/ethylene glycol copolymer (copolymerization ratio=22.5/2.5/25/50 [mol. %]). Compound C is adipic acid/succinic acid/ethylene glycol copolymer (copolymerization ratio=25/25/50 [mol. %]). Compound D is terephthalic acid/succinic acid/propylene glycol/ethylene glycol copolymer (copolymerization ratio=27.5/22.5/25/25 [mol. %]). Compound E is terephthalic acid/phthalic acid/succinic acid/propylene glycol/ethylene glycol copolymer (copolymerization ratio=22.5/2.5/25/37.5/12.5 [mol. %]). Compounds A to E are all non-phosphate compounds and are retardation enhancers. Compounds A to D are acetyl-terminated; and Compound E is not blocked at the terminals. Compound F is a non-phosphate compound, Wako Pure Chemicals' 1,2,3,4,6-penta-O-acetyl-β-D-glucopyranose. Compound (I-2) is shown below, which is given in JP-A 2008-262161 as an example of the structure of a retardation enhancer. TPP is triphenyl phosphate. BDP is biphenyldiphenyl phosphate.

In Table 1, CAP 2.45 is cellulose acetate propionate having a degree of acetyl substitution of 2.37 and a degree of propionyl substitution of 0.8; CAP 2.1 is cellulose acetate propionate having a degree of acetyl substitution of 1.6 and a degree of propionyl substitution of 0.5.

Compound (I-2)

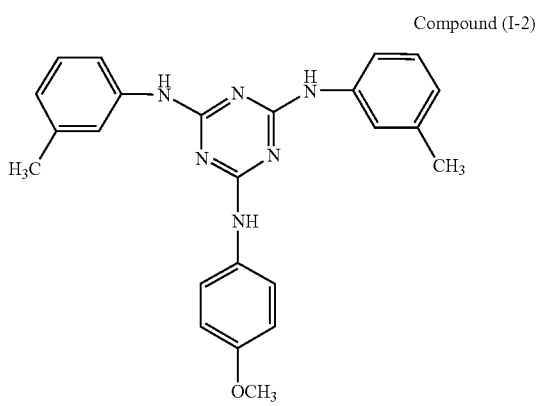 [SMILES: COc1ccc(Nc2nc(Nc3cccc(C)c3)nc(Nc3cccc(C)c3)n2)cc1]

Preparation of Cellulose Acylate Solutions "S01" to "S13" for High-Substitution Layer)

The following composition was put into a mixing tank and stirred to dissolve the ingredients, thereby preparing a cellulose acylate solution. The amount of the solvent (methylene chloride and methanol) was suitably controlled so that the solid concentration in the cellulose acylate solution could be as in Table 2 below.

| | |
|---|---|
| Cellulose acetate (degree of substitution 2.79) | 100.0 mas. pts. |
| Triphenyl phosphate | 6.0 mas. pts. |
| Diphenylbiphenyl phosphate | 5.0 mas. pts. |
| Silica fine particles R972 (by Nippon Aerosil) | 0.15 mas. pts. |
| Methylene chloride | 395.0 mas. pts. |
| Methanol | 59.0 mas. pts. |

The other cellulose acylate solutions for high-substitution layer were prepared in the same manner as that for "S01", for which, however, the degree of substitution of cellulose acylate, and the amount and the type of the additives were changed as in Table 2 below. The solid concentration and the viscosity of the thus-obtained cellulose acylate solutions for high-substitution layer are shown in Table 2 below.

TABLE 2

| Solution No. | Cellulose Acylate Degree of Substitution | (mas. pt.) | Additive 1 Compound | (mas. pt.) | Additive 2 Compound | (mas. pt.) | Silica Fine Particles (mas. pt.) | Solid Concentration (mas. %) | Viscosity (Pa·s) |
|---|---|---|---|---|---|---|---|---|---|
| S01 | 2.79 | 100 | TPP | 6 | BDP | 5 | 0.15 | 19.7 | 40 |
| S02 | 2.79 | 100 | A | 11 | — | — | 0.15 | 19.7 | 40 |
| S03 | 2.79 | 100 | A | 18.5 | — | — | 0.15 | 19.7 | 30 |
| S04 | 2.87 | 100 | A | 11 | — | — | 0.15 | 19.7 | 30 |
| S05 | 2.93 | 100 | A | 11 | — | — | 0.15 | 19.7 | 30 |
| S06 | 2.79 | 100 | A | 18.5 | — | — | — | 19.7 | 30 |
| S07 | 2.79 | 100 | B | 11 | — | — | 0.15 | 19.7 | 40 |
| S08 | 2.79 | 100 | C | 11 | — | — | 0.15 | 19.7 | 40 |
| S09 | 2.79 | 100 | D | 11 | — | — | 0.15 | 19.7 | 40 |
| S10 | 2.79 | 100 | D | 19 | — | — | 0.15 | 20 | 30 |
| S11 | 2.79 | 100 | E | 11 | — | — | 0.15 | 19.7 | 40 |
| S12 | 2.79 | 100 | F | 11 | — | — | 0.15 | 19.7 | 40 |
| S13 | 2.79 | 100 | F | 11 | — | — | 0.15 | 19.7 | 40 |

Examples and Comparative Examples (Preparation of Cellulose Acylate Samples)

The cellulose acylate solution for low-substitution layer was cast to give a core layer having the thickness shown in Table 3, and the cellulose acylate solution for high-substitution layer was to give a skin A layer and a skin B layer each having the thickness shown in Table 3. The formed web (film) was peeled off from the band, held between clips, and laterally stretched under the condition shown in Table 3 below while the residual solvent amount therein was from 5 to 20% by mass of the film. Next, the clips were removed from the film, the film was dried at 130° C. for 20 minutes, and then again laterally stretched with a tenter under the condition shown in Table 3 below.

The residual solvent amount was computed according to the following formula:

Residual Solvent Amount (mas. %) = $\{(M-N)/N\} \times 100$ wherein M is the mass of wet at an indefinite time, N is the mass of the web dried at 120° C. for 2 hours after its M was measured.

Tg (glass transition temperature) of the formed film was measured as follows: A sample of 5 mm×30 mm was conditioned at 25° C. and 60% RH for 2 hours or more. Using a dynamic viscoelastic analyzer DVA-225 (by IT Instrument & Control) with a grip distance of 20 mm and at a frequency of 1 Hz, the sample was analyzed and the temperature at tan δ at which the storage modulus (E') and the loss modulus (E'') thereof were replaced with each other was read, and this was Tg. The obtained results are shown in Table 3 below.

TABLE 3

| Sample No. | Core Layer Solution | Core Layer Thickness (μm) | Skin A Layer Solution | Skin A Layer Thickness (μm) | Skin B Layer Solution | Skin B Layer Thickness (μm) | Tg (° C.) | Stretching Temperature (° C.) | Stretching Draw Ratio | Re-Stretching Temperature (° C.) | Re-Stretching Draw Ratio |
|---|---|---|---|---|---|---|---|---|---|---|---|
| Example 1 | C01 | 56 | S01 | 2 | S01 | 2 | 180 | 140 | 1.07 | 180 | 1.19 |
| Example 2 | C01 | 56 | S02 | 2 | S02 | 2 | 180 | 140 | 1.07 | 180 | 1.19 |
| Example 3 | C01 | 56 | S06 | 2 | S06 | 2 | 175 | 140 | 1.07 | 180 | 1.19 |
| Example 4 | C01 | 56 | S03 | 2 | S03 | 2 | 175 | 140 | 1.07 | 180 | 1.19 |
| Example 5 | C02 | 54 | S02 | 2 | S02 | 2 | 185 | 140 | 1.08 | 175 | 1.19 |
| Example 6 | C03 | 58 | S02 | 2 | S02 | 2 | 175 | 140 | 1.06 | 185 | 1.18 |
| Example 7 | C04 | 46 | S02 | 2 | S02 | 2 | 175 | 140 | 1.07 | 180 | 1.21 |
| Example 9 | C06 | 58 | S02 | 2 | S02 | 2 | 175 | 140 | 1.07 | 180 | 1.19 |
| Example 10 | C07 | 58 | S02 | 2 | S02 | 2 | 175 | 140 | 1.07 | 180 | 1.19 |
| Example 11 | C08 | 61 | S02 | 2 | S02 | 2 | 178 | 140 | 1.07 | 180 | 1.26 |
| Example 12 | C09 | 51 | S02 | 2 | S02 | 2 | 182 | 140 | 1.07 | 180 | 1.12 |
| Example 13 | C01 | 56 | S04 | 2 | S04 | 2 | 180 | 140 | 1.07 | 180 | 1.19 |
| Example 14 | C01 | 56 | S05 | 2 | S05 | 2 | 180 | 140 | 1.07 | 180 | 1.19 |
| Example 15 | C01 | 56 | no | — | S02 | 2 | 180 | 140 | 1.07 | 180 | 1.19 |
| Example 16 | C01 | 52 | S02 | 4 | S02 | 4 | 180 | 140 | 1.07 | 180 | 1.19 |
| Example 17 | C01 | 54 | S02 | 2 | S02 | 4 | 180 | 140 | 1.07 | 180 | 1.19 |
| Example 18 | C01 | 56 | S02 | 2 | S02 | 2 | 180 | 180 | 1.27 | — | — |
| Comparative Example 1 | C11 | 56 | S02 | 2 | S02 | 2 | 182 | 140 | 1.07 | 180 | 1.19 |
| Comparative Example 2 | C10 | 56 | S01 | 2 | S01 | 2 | 178 | 140 | 1.07 | 180 | 1.19 |
| Comparative Example 3 | According to the condition in Example 1 in JP-A 8-207210. | | | | | | | | | | |
| Comparative Example 4 | According to the condition for Sample 21 in Example 1 in JP-A 2003-33998. | | | | | | | | | | |
| Comparative Example 5 | According to the condition in Example 2 in Japanese Patent 3459779. | | | | | | | | | | |
| Example 21 | C12 | 56 | S09 | 2 | S09 | 2 | 175 | 140 | 1.08 | 180 | 1.2 |
| Example 22 | C12 | 56 | S10 | 2 | S10 | 2 | 175 | 140 | 1.08 | 180 | 1.2 |

TABLE 3-continued

| Sample No. | Core Layer Constitution Solution | Thickness (μm) | Skin A Layer Constitution Solution | Thickness (μm) | Skin B Layer Constitution Solution | Thickness (μm) | Tg (° C.) | Stretching Condition Temperature (° C.) | Draw Ratio | Re-Stretching Condition Temperature (° C.) | Draw Ratio |
|---|---|---|---|---|---|---|---|---|---|---|---|
| Example 23 | C13 | 56 | S09 | 2 | S09 | 2 | 180 | 140 | 1.08 | 180 | 1.2 |
| Example 24 | C14 | 56 | S11 | 2 | S11 | 2 | 175 | 140 | 1.08 | 180 | 1.2 |
| Example 25 | C15 | 56 | S11 | 2 | S11 | 2 | 180 | 140 | 1.08 | 180 | 1.2 |
| Example 26 | C16 | 56 | S02 | 2 | S02 | 2 | 175 | 140 | 1.08 | 180 | 1.2 |
| Example 27 | C17 | 56 | S09 | 2 | S09 | 2 | 175 | 140 | 1.08 | 180 | 1.2 |
| Example 28 | C18 | 56 | S09 | 2 | S09 | 2 | 175 | 140 | 1.08 | 180 | 1.2 |
| Example 29 | C12 | 114 | S09 | 2 | S09 | 2 | 180 | 170 | 1 | 180 | 1.24 |
| Example 30 | C12 | 136 | S09 | 2 | S09 | 2 | 180 | 170 | 1 | 180 | 1.22 |
| Example 31 | C12 | 144 | S09 | 2 | S09 | 2 | 180 | 170 | 1 | 170 | 1.15 |
| Example 32 | C19 | 110 | S12 | 2 | S09 | 2 | 170 | 130 | 1.2 | 170 | 1.04 |
| Example 33 | C20 | 80 | S13 | 2 | S09 | 2 | 170 | 130 | 1.3 | — | — |

Comparative Example 3

The film sample of Example 1 in JP-A 8-207210 was produced according to the method described in the publication. The conditions not described in the publication were the same as in Example 18 herein. The film of Comparative Example 3 is a laminate film that comprises cellulose acetate having a degree of substitution of 2.5 as the core layer and cellulose acetate having a degree of substitution of 2.9 as the surface layer, in which, however, the core layer does not contain a non-phosphate compound.

Comparative Example 4

The film sample No. 21 in JP-A 2003-33998 was produced according to the method described in the publication. The conditions not described in the publication were the same as in Example 18 herein. The film of Comparative Example 4 is a laminate film that comprises cellulose acetate having a degree of substitution of 2.65 as the core layer, in which, however, the surface layer comprises cellulose acetate having a degree of substitution of 2.65 but falling outside the scope of formula (2) of the present invention, and in which the core layer does not contain a non-phosphate compound.

Comparative Example 5

The film sample of Example 2 in Japanese Patent 3459779 was produced according to the method described in the publication. The conditions not described in the publication were the same as in Example 18 herein. The film of Comparative Example 5 is a single-layer film that comprises cellulose acetate having a degree of substitution of 2.534 and a non-phosphate compound, dibutyl phthalate (compound (a) in Table 4 below); however, this does not have a high-substitution layer.

Concrete constitutions of the film samples of Examples and Comparative Examples are shown in Table 4 below. In Table 4 below, Compound E-15 used in Comparative Example 4 is a compound described in JP-A 2003-33998, and its structure is shown below. Compound (a) used in Comparative Example 5 is dibutyl phthalate.

Compound E-15:

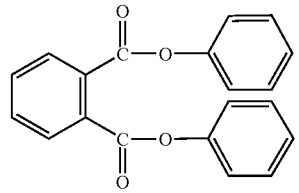

TABLE 4

| Sample No. | Constitution of Core Layer Degree of Acyl Substitution | Additive 1 Compound | Additive 1 (mas. pt.) | Additive 2 Type | Additive 2 (mas. pt.) | Constitution of Skin A Layer/Skin B layer Degree of Acyl Substitution | Additive 1 Type | Additive 1 (mas. pt.) | Additive 2 Type | Additive 2 (mas. pt.) | Silica (mas. pt.) | Thickness Core Layer (μm) | Skin A Layer (μm) | Skin B Layer (μm) |
|---|---|---|---|---|---|---|---|---|---|---|---|---|---|---|
| Example 1 | 2.45 | A | 18.5 | — | — | 2.79 | TPP | 6 | BDP | 5 | 0.15 | 56 | 2 | 2 |
| Example 2 | 2.45 | A | 18.5 | — | — | 2.79 | A | 11.3 | — | — | 0.15 | 56 | 2 | 2 |
| Example 3 | 2.45 | A | 18.5 | — | — | 2.79 | A | 11.3 | — | — | — | 56 | 2 | 2 |
| Example 4 | 2.45 | A | 18.5 | — | — | 2.79 | A | 18.5 | — | — | 0.15 | 56 | 2 | 2 |
| Example 5 | 2.45 | A | 15 | — | — | 2.79 | A | 11.3 | — | — | 0.15 | 54 | 2 | 2 |
| Example 6 | 2.45 | A | 20 | — | — | 2.79 | A | 11.3 | — | — | 0.15 | 58 | 2 | 2 |
| Example 7 | 2.45 | A | 18.5 | (I-2) | 1.5 | 2.79 | A | 11.3 | — | — | 0.15 | 46 | 2 | 2 |
| Example 9 | 2.45 | B | 20 | — | — | 2.79 | A | 11.3 | — | — | 0.15 | 58 | 2 | 2 |
| Example 10 | 2.45 | C | 20 | — | — | 2.79 | A | 11.3 | — | — | 0.15 | 58 | 2 | 2 |
| Example 11 | 2.55 | A | 18.5 | — | — | 2.79 | A | 11.3 | — | — | 0.15 | 61 | 2 | 2 |
| Example 12 | 2.35 | A | 18.5 | — | — | 2.79 | A | 11.3 | — | — | 0.15 | 51 | 2 | 2 |
| Example 13 | 2.45 | A | 18.5 | — | — | 2.93 | A | 11.3 | — | — | 0.15 | 56 | 2 | 2 |
| Example 14 | 2.45 | A | 18.5 | — | — | 2.87 | A | 11.3 | — | — | 0.15 | 56 | 2 | 2 |
| Example 15 | 2.45 | A | 18.5 | — | — | 2.79 | A | 11.3 | — | — | 0.15 | 56 | — | 2 |
| Example 16 | 2.45 | A | 18.5 | — | — | 2.79 | A | 11.3 | — | — | 0.15 | 52 | 4 | 4 |
| Example 17 | 2.45 | A | 18.5 | — | — | 2.79 | A | 11.3 | — | — | 0.15 | 54 | 2 | 4 |

TABLE 4-continued

| | Constitution of Core Layer | | | | | Constitution of Skin A Layer/Skin B layer | | | | | Thickness | | |
|---|---|---|---|---|---|---|---|---|---|---|---|---|---|
| | Degree of | Additive 1 | | Additive 2 | | Degree of | Additive 1 | | Additive 2 | | Silica | Core | Skin A | Skin B |
| Sample No. | Acyl Substitution | Compound | (mas. pt.) | Type | (mas. pt.) | Acyl Substitution | Type | (mas. pt.) | Type | (mas. pt.) | (mas. pt.) | Layer (μm) | Layer (μm) | Layer (μm) |
| Example 18 | 2.45 | A | 18.5 | — | — | 2.79 | A | 11.3 | — | — | 0.15 | 56 | 2 | 2 |
| Comparative Example 1 | 2.79 | A | 18.5 | — | — | 2.79 | A | 11.3 | — | — | 0.15 | 56 | 2 | 2 |
| Comparative Example 2 | 2.45 | TPP | 11 | BDP | 7.5 | 2.79 | TPP | 6 | BDP | 5 | 0.15 | 56 | 2 | 2 |
| Comparative Example 3 | 2.5 | TPP | 10 | — | — | 2.9 | TPP | 13 | — | — | — | 58 | 2.5 | 2.5 |
| Comparative Example 4 | 2.65 | E-15 | — | — | — | 2.65 | — | — | — | — | 0.2 | 25 | 4 | 4 |
| Comparative Example 5 | 2.534 | (a) | 3 | — | — | | no | | | | | 60 | no | |
| Example 21 | 2.45 | D | 19 | — | — | 2.79 | D | 19 | — | — | 0.15 | 56 | 2 | 2 |
| Example 22 | 2.45 | D | 19 | — | — | 2.79 | D | 11 | — | — | 0.15 | 56 | 2 | 2 |
| Example 23 | 2.45 | D | 15 | — | — | 2.79 | D | 11 | — | — | 0.15 | 56 | 2 | 2 |
| Example 24 | 2.45 | E | 20 | — | — | 2.79 | E | 11 | — | — | 0.15 | 56 | 2 | 2 |
| Example 25 | 2.45 | E | 15 | — | — | 2.79 | E | 11 | — | — | 0.15 | 56 | 2 | 2 |
| Example 26 | CAP 2.45 | D | 19 | — | — | 2.79 | D | 11 | — | — | 0.15 | 56 | 2 | 2 |
| Example 27 | 2.45 | D | 19 | I-2 | 2 | 2.79 | D | 11 | — | — | 0.15 | 56 | 2 | 2 |
| Example 28 | 2.45 | D | 19 | I-2 | 2.5 | 2.79 | D | 11 | — | — | 0.15 | 56 | 2 | 2 |
| Example 29 | 2.45 | D | 19 | — | — | 2.79 | D | 11 | — | — | 0.15 | 114 | 2 | 2 |
| Example 30 | 2.45 | D | 19 | — | — | 2.79 | D | 11 | — | — | 0.15 | 140 | 2 | 2 |
| Example 31 | 2.45 | D | 19 | — | — | 2.79 | D | 11 | — | — | 0.15 | 148 | 2 | 2 |
| Example 32 | CAP 2.1 | F | 25 | — | — | 2.79 | F | 11 | — | — | 0.15 | 110 | 2 | 2 |
| Example 33 | CAP 2.1 | F | 25 | — | — | 2.79 | F | 11 | — | — | 0.15 | 80 | 2 | 2 |

The films of Examples and Comparative Examples were analyzed and evaluated for the properties thereof in the manner mentioned below.

<Haze of Film>

The haze was measured as follows: The film sample of 40 mm×80 mm was coated with liquid paraffin on both sides thereof, and sandwiched between glass sheets. Using a haze meter (HGM-2DP, by Suga Test Instruments) at 25° C. and a relative humidity of 60%, the sample was analyzed according to JIS K-6714. The data of the liquid paraffin alone with no film sandwiched and the glass sheet are the blank. The obtained results are shown in Table 5 below.

<Retardation of Film>

Using an automatic birefringence meter KOBRA-WR (by Oji Test Instruments), the film sample was analyzed for three-dimensional birefringence thereof at a wavelength of 440 nm, 550 nm, 590 nm and 630 nm, and the in-plane retardation $Re(\lambda)$ ($\lambda$ means the wavelength) of the film sample was determined. Re was measured at different tilt angles, and the thickness-direction retardation $Rth(\lambda)$ ($\lambda$ means the wavelength) of the film sample was determined. The data of Re and Rth at varying wavelengths of the film samples are shown in Table 5 below. The value of Re(630)−Re(440) and the value of Rth(630)−Rth(440) of each film sample are also in Table 5.

TABLE 5

| Sample No. | Re(440) (nm) | Re(550) (nm) | Re(590) (nm) | Re(630) (nm) | Rth(440) (nm) | Rth(550) (nm) | Rth(590) (nm) | Rth(630) (nm) | Re(630) − Re(440) (nm) | Rth(630) − Rth(440) (nm) | Thickness (μm) | Haze |
|---|---|---|---|---|---|---|---|---|---|---|---|---|
| Example 1 | 50.0 | 52.0 | 53.0 | 53.5 | 111.9 | 117.0 | 118.0 | 119.0 | 3.5 | 7.1 | 59 | 0.15 |
| Example 2 | 52.0 | 54.0 | 55.0 | 55.5 | 113.8 | 119.0 | 120.0 | 121.0 | 3.5 | 7.2 | 60 | 0.09 |
| Example 3 | 51.0 | 53.0 | 54.0 | 54.4 | 113.8 | 119.0 | 120.0 | 121.0 | 3.4 | 7.2 | 60 | 0.06 |
| Example 4 | 52.0 | 54.0 | 55.0 | 55.5 | 114.8 | 120.0 | 121.0 | 122.0 | 3.5 | 7.2 | 60 | 0.07 |
| Example 5 | 52.0 | 54.0 | 55.0 | 55.5 | 113.8 | 119.0 | 120.0 | 121.0 | 3.5 | 7.2 | 58 | 0.11 |
| Example 6 | 52.0 | 54.0 | 55.0 | 55.5 | 113.8 | 119.0 | 120.0 | 121.0 | 3.5 | 7.2 | 62 | 0.08 |
| Example 7 | 53.7 | 54.5 | 55.0 | 55.2 | 118.9 | 121.0 | 122.0 | 122.5 | 1.5 | 3.6 | 50 | 0.09 |
| Example 8 | 52.0 | 53.0 | 55.0 | 55.5 | 114.0 | 119.0 | 120.0 | 121.0 | 3.5 | 7.0 | 62 | 0.08 |
| Example 10 | 52.0 | 54.0 | 55.0 | 55.5 | 113.8 | 119.0 | 120.0 | 121.0 | 3.5 | 7.2 | 62 | 0.08 |
| Example 11 | 49.5 | 51.0 | 52.0 | 52.5 | 111.5 | 116.0 | 117.0 | 118.0 | 3.0 | 6.5 | 65 | 0.09 |
| Example 12 | 54.0 | 56.0 | 57.0 | 57.7 | 116.0 | 121.0 | 122.0 | 123.3 | 3.7 | 7.3 | 55 | 0.09 |
| Example 13 | 49.0 | 51.0 | 52.0 | 53.0 | 115.0 | 121.0 | 122.0 | 123.0 | 4.0 | 8.0 | 60 | 0.09 |
| Example 14 | 53.1 | 55.0 | 56.0 | 56.8 | 113.5 | 119.0 | 120.0 | 121.0 | 3.7 | 7.5 | 60 | 0.09 |
| Example 15 | 52.5 | 54.0 | 55.0 | 55.5 | 115.2 | 120.0 | 121.0 | 122.0 | 3.0 | 6.8 | 58 | 0.09 |
| Example 16 | 51.5 | 53.5 | 55.0 | 55.5 | 113.2 | 119.0 | 120.0 | 121.3 | 4.0 | 8.1 | 60 | 0.09 |
| Example 17 | 51.9 | 53.8 | 55.0 | 55.6 | 113.6 | 119.0 | 120.0 | 121.2 | 3.7 | 7.6 | 60 | 0.09 |
| Example 18 | 47.0 | 48.9 | 50.0 | 50.5 | 118.3 | 124.0 | 125.0 | 125.5 | 3.5 | 7.2 | 60 | 0.15 |
| Comparative Example 1 | 18.9 | 19.5 | 20.0 | 20.0 | 88.3 | 89.5 | 90.0 | 90.5 | 1.1 | 2.2 | 60 | 0.4 |
| Comparative Example 2 | 47.0 | 48.9 | 50.0 | 50.5 | 111.3 | 117.0 | 118.0 | 118.5 | 3.5 | 7.2 | 60 | 0.4 |
| Comparative Example 3 | 37.0 | 39.0 | 40.0 | 40.0 | 115.0 | 119.0 | 120.0 | 121.0 | 3.0 | 6.0 | 63 | 1.0 |

TABLE 5-continued

| Sample No. | Re(440) (nm) | Re(550) (nm) | Re(590) (nm) | Re(630) (nm) | Rth(440) (nm) | Rth(550) (nm) | Rth(590) (nm) | Rth(630) (nm) | Re(630) − Re(440) (nm) | Rth(630) − Rth(440) (nm) | Thickness (μm) | Haze |
|---|---|---|---|---|---|---|---|---|---|---|---|---|
| Comparative Example 4 | 32.0 | 31.0 | 30.0 | 30.0 | 86.0 | 82.0 | 80.0 | 80.0 | −2.0 | −6.0 | 33 | 0.8 |
| Comparative Example 5 | 36.0 | 39.0 | 40.0 | 42.0 | 132.0 | 139.0 | 140.0 | 142.0 | 6.0 | 10.0 | 60 | 1.5 |
| Example 21 | 52.0 | 54.0 | 55.0 | 55.5 | 113.8 | 119.0 | 120.0 | 121.0 | 3.5 | 7.2 | 60 | 0.09 |
| Example 22 | 51.0 | 53.0 | 54.0 | 54.4 | 113.8 | 119.0 | 120.0 | 121.0 | 3.4 | 7.2 | 60 | 0.06 |
| Example 23 | 52.0 | 54.0 | 55.0 | 55.5 | 114.8 | 120.0 | 121.0 | 122.0 | 3.5 | 7.2 | 60 | 0.07 |
| Example 24 | 52.0 | 54.0 | 55.0 | 55.5 | 113.8 | 119.0 | 120.0 | 121.0 | 3.5 | 7.2 | 60 | 0.09 |
| Example 25 | 51.0 | 53.0 | 54.0 | 54.4 | 113.8 | 119.0 | 120.0 | 121.0 | 3.4 | 7.2 | 60 | 0.06 |
| Example 26 | 52.0 | 54.0 | 55.0 | 55.5 | 114.8 | 120.0 | 121.0 | 122.0 | 3.5 | 7.2 | 60 | 0.07 |
| Example 27 | 53.0 | 54.0 | 54.5 | 54.5 | 117.0 | 119.0 | 120.0 | 120.6 | 1.5 | 3.6 | 60 | 0.09 |
| Example 28 | 53.0 | 53.0 | 53.0 | 53.0 | 119.0 | 119.0 | 119.0 | 119.0 | 0.0 | 0.0 | 60 | 0.09 |
| Example 29 | 67.0 | 70.0 | 70.5 | 71.0 | 193.0 | 200.0 | 202.0 | 203.0 | 4.0 | 10.0 | 118 | 0.1 |
| Example 30 | 67.0 | 70.0 | 71.0 | 71.5 | 220.5 | 230.0 | 231.5 | 232.5 | 4.5 | 12.0 | 140 | 0.12 |
| Example 31 | 77.0 | 80.0 | 80.5 | 81.0 | 271.0 | 280.0 | 282.0 | 282.5 | 4.0 | 11.5 | 148 | 0.14 |
| Example 32 | 77.0 | 81.0 | 82.0 | 83.0 | 271.0 | 282.0 | 283.0 | 284.0 | 4.5 | 13.0 | 114 | 0.15 |
| Example 33 | 67.0 | 70.0 | 71.0 | 71.5 | 220.0 | 230.0 | 232.0 | 233.0 | 4.5 | 13.0 | 84 | 0.19 |

As in Table 5 above, the cellulose acylate laminate films of Examples of the invention all had a low haze, and their Re(550) was equal to or larger than Re(440). At a longer wavelength, their Re and Rth did not decrease, and they had good wavelength dispersion characteristics of retardation, and in addition, their retardation expression was good. Except that of Example 28, all the cellulose acylate laminate films of Examples had a low haze, and their Re(550) was larger than Re(440). At a longer wavelength, their Re and Rth increased, and they had good wavelength dispersion characteristics of retardation, and in addition, their retardation expression was good. On the other hand, in the film of Comparative Example 1, in which the cellulose acylate of the core layer has a high degree of substitution, the retardation expression was low; and the value of Re(630)-Re(440) of the comparative film, which indicates the wavelength dispersion characteristics of retardation of the film, was small. In the film of Comparative Example 2 in which the core layer contained phosphate compounds TPP and BDP, the retardation expression was insufficient, and the haze of the film was high.

In the film of Comparative Example 3, the retardation expression was also insufficient, and the haze of the film was high.

The haze of the film of Comparative Example 4 was low in some degree; however, the retardation expression in the film was seriously poor, and the haze of the film was high.

The haze of the film of Comparative Example 5 was high.

From the results of Example 13 and Example 16, it is known that, in the constitution of the invention, the wavelength dispersion characteristics of retardation can be independently controlled by controlling the degree of substitution of the cellulose acylate of the skin layer and controlling the thickness of the skin layer itself, not significantly changing the retardation expressibility of the film. From the characteristics of the film, it is known that the cellulose acylate laminate film of the invention is greatly useful in making the film compatible with the liquid crystal cell in a liquid crystal display device in point of the wavelength dispersion characteristics of retardation thereof.

<Production of Polarizer Sample>

The surface of the cellulose acylate laminate film of Examples and Comparative Examples produced in the above was alkali-saponified. Briefly, the film was dipped in an aqueous 1.5 N sodium hydroxide solution at 55° C. for 2 minutes, then washed in a washing bath at room temperature, and neutralized with 0.1 N sulfuric acid at 30° C. Again this was washed in a washing bath at room temperature, and dried with hot air at 100° C. On the other hand, a roll of polyvinyl alcohol film having a thickness of 80 μm was unrolled and continuously stretched by 5 times in an aqueous iodine solution, and dried to give a polarizing element having a thickness of 20 μm. Using an aqueous 3% solution of polyvinyl alcohol (Kuraray's PVA-117H) serving as an adhesive, the alkali-saponified cellulose acylate laminate film of Examples and Comparative Examples was stuck to a film of Fujitac TD80UL (by FUJIFILM) that had been alkali-saponified in the same manner as above, with the polarizing element sandwiched therebetween and with the saponified faces of the two films kept facing each other, thereby constructing a polarizer of the cellulose acylate laminate film of Examples and Comparative Examples, the polarizing element, and TD80UL laminated in that order. In this, the MD direction of the cellulose acylate laminate film and the slow axis of TD80UL were kept in parallel to the absorption axis of the polarizing element.

<Production of Liquid Crystal Display Device>

On both sides of a VA-mode liquid crystal TV (LCD-40MZW100, by Mitsubishi), the polarizers and the retarders were peeled off, and the resulting liquid crystal cell was used here. As in FIG. 1, an outer protective film (not shown), the polarizing element 11, the cellulose acylate laminate film 14 of Examples and Comparative Examples shown in Table 6 below, the liquid crystal cell 13 (above-mentioned VA-mode liquid crystal cell), the optically anisotropic film (Fujitac TD80UL) 15, the polarizing element 12, and an outer protective film (not shown) were stuck in that order with an adhesive, thereby producing a liquid crystal display device of Examples and Comparative Examples. In this, the absorption axes of the upper and lower polarizers were kept perpendicular to each other. In Examples 29 and 33, the cellulose acylate laminate film of the invention was on the front side (panel side), and the rear-side cellulose acylate film was FUJIFILM's Fujitac TD80UF; in Example 30, the front-side cellulose acylate film was Fujitac TD80UF, and the cellulose acylate laminate film was used on the rear side; in Examples 31 and 32, FUJIFILM's Zerotac ZRF80 was used on the front side, and the cellulose acylate laminate film of the invention was on the rear side.

<Evaluation of Liquid Crystal Display Device>
(Evaluation of Panel Color Shift and Viewing Angle)

In the VA-mode liquid crystal display device produced in the above, a backlight was arranged on the side of the polarizing element 11 in FIG. 1. Using a tester (EZ-Contrast XL88, by ELDIM), the brightness and the chromaticity at the time of black level and white level of display were measured in a dark room; and the color shift at the time of black level of display and the contrast ratio (CR) were computed.

(Contrast Ratio)

The found data were evaluated according to the following criteria.

A: At least 3000, and this is favorable for practical use.
B: From 2000 to less than 3000, and this brings about no problem in practical use.
C: From 1500 to less than 2000, and this is on a practicable level.
D: Less than 1500, and this is problematic in practical use.

The obtained results are shown in Table 6 below.

(Viewing Angle (Color Shift in Polar Angle Direction))

At the time of black level of display, the viewing angle was inclined from the normal direction to the liquid crystal cell toward the center line direction of the transmission axis of the pair of polarizers (azimuth angle of 45 degrees), and the chromaticity changes $\Delta x_\theta$ and $\Delta y_\theta$ were measured within a polar angle range of from 0 to 80 degrees. $\Delta x_\theta = x_\theta - X_{\theta 0}$, and $\Delta y_\theta = y_\theta - y_{\theta 0}$. $(x_{\theta 0}, y_{\theta 0})$ are chromaticity data measured in the normal direction to the liquid crystal cell at the time of black level of display; and $(x_\theta, y_\theta)$ are chromaticity data measured at the time of black level of display, at a viewing angle inclined by a polar angle θ degrees toward the center line direction of the transmission axis of the pair of polarizers from the normal direction to the liquid crystal cell.

The data were evaluated according to the following criteria. The obtained results are shown in Table 6 below.

A: $\Delta x_\theta$ and $\Delta y_\theta$ are both at most 0.02.
B: $\Delta x_\theta$ and $\Delta y_\theta$ are both at most 0.03.
C: $\Delta x_\theta$ and $\Delta y_\theta$ are both at most 0.05.
D: $\Delta x_\theta$ and $\Delta y_\theta$ are both more than 0.1

Preferably, the color shift in the polar angle direction with the film of the invention always satisfies the following numerical formulae (II) and (III):

$$0 \leq \Delta x_\theta \leq 0.1 \quad (II)$$

$$0 \leq \Delta y_\theta \leq 0.1 \quad (III)$$

TABLE 6

| Film Sample No. | | CR | Viewing Angle |
|---|---|---|---|
| Example 101 | Example 1 | B | B |
| Example 102 | Example 2 | B | B |
| Example 103 | Example 3 | A | B |
| Example 104 | Example 4 | B | B |
| Example 105 | Example 5 | B | B |
| Example 106 | Example 6 | B | B |

TABLE 6-continued

| Film Sample No. | | CR | Viewing Angle |
|---|---|---|---|
| Example 107 | Example 7 | B | B |
| Example 109 | Example 9 | B | B |
| Example 110 | Example 10 | B | B |
| Example 111 | Example 11 | B | B |
| Example 112 | Example 12 | B | B |
| Example 113 | Example 13 | B | A |
| Example 114 | Example 14 | B | B |
| Example 115 | Example 15 | B | B |
| Example 116 | Example 16 | B | A |
| Example 117 | Example 17 | B | B |
| Example 118 | Example 18 | B | B |
| Comparative Example 101 | Comparative Example 1 | D | D |
| Comparative Example 102 | Comparative Example 2 | D | B |
| Comparative Example 103 | Comparative Example 3 | D | C |
| Comparative Example 104 | Comparative Example 4 | D | D |
| Comparative Example 105 | Comparative Example 5 | D | D |
| Example 121 | Example 21 | B | B |
| Example 122 | Example 22 | B | A |
| Example 123 | Example 23 | B | B |
| Example 124 | Example 24 | B | B |
| Example 125 | Example 25 | B | A |
| Example 126 | Example 26 | B | B |
| Example 127 | Example 27 | B | B |
| Example 128 | Example 28 | B | C |
| Example 129 | Example 29 | B | C |
| Example 130 | Example 30 | B | C |
| Example 131 | Example 31 | B | C |
| Example 132 | Example 32 | B | C |
| Example 133 | Example 33 | B | C |

From Table 6, it is known that the liquid crystal display devices of Examples 101 to 133 of the invention are good as the contrast ratio is high and the color shift in the polar angle direction is small (that is, the viewing angle dependence of the color shift is low), or that is, the displaying abilities of these devices are obviously improved. Of those Examples, the comparison between Example 7 and Example 13 indicates that the control of the wavelength dispersion characteristics of retardation not changing the retardation expressibility is favorable.

On the other hand, the liquid crystal display device of Comparative Example 101, in which the film of Comparative Example 1 having a high haze, bad wavelength dispersion characteristics and low retardation expressibility was incorporated, was not good as the contrast was low and the viewing angle dependence was large. The liquid crystal display devices of Comparative Examples 102 and 103, in which the film of Comparative Examples 2 and 3 having good retardation expressibility but having a high haze was incorporated, were not good as the contrast ratio was low though their viewing angle dependence was reduced. The liquid crystal display devices of Comparative Examples 101, 104 and 105 were not good, as they could not satisfy both high contrast ratio and reduced viewing angle dependence.

As in the above, the cellulose acylate laminate film having the constitution of the invention can control the retardation expression and the wavelength dispersion characteristics of retardation independently of each other, and the wavelength dispersion characteristics of retardation of the film is so improved that the retardation expression level may not reduce at a longer wavelength, and therefore the film can keep a reduced haze. As a result, the liquid crystal display device of the invention with the film of the invention incorporated therein satisfies both increased contrast ratio and reduced viewing angle dependence both on a high level.

Example 34

The cellulose acylate solution C01 for low-substitution layer and the cellulose acylate solution S02 for high-substitution layer in Table 1 above were cast under the same condition as in Example 2, except that the solution C01 was diluted to have a viscosity of about 30 Pa·s and the solution C01 was diluted to have a viscosity of at least 60 Pa·s. Finally, a film sample was produced, but it required an extremely large load in peeling it from the band.

Example 35

The cellulose solution C01 or C12 for low-substitution layer alone in Table 1 above was cast under the same condition as in Example 1, but this could not be peeled from the band and a film sample could not be obtained.

Other Examples

The film samples of Examples 1-2, 2-2, 3-2, 4-2, 5-2, 6-2, 7-2, 9-2, 10-2, 21-2, 22-2, 23-2, 24-2 and 25-2 were produced by the same process as Examples 1 to 7, 9, 10 and 21 to 25, except that cellulose acetate A was replaced by one of the cellulose acetates B to H shown in Table 7 as indicated in Table. 8. The produced films were evaluated as described below and the results are shown in Table 8.

TABLE 7

| | Cellulose Acetate | | | | | | | |
|---|---|---|---|---|---|---|---|---|
| | A | B | C | D | E | F | G | H |
| Degree of Acetyl Substitution | 2.45 | 2.45 | 2.45 | 2.45 | 2.44 | 2.43 | 2.45 | 2.45 |
| Raw Material | HP | HP | HP | HP | HP | HP | HP | Linter |
| Fe (ppm) | 3 | 3 | 3 | 0.5 | 3 | 3 | 3 | 3 |
| Ca (ppm) | 120 | 40 | 75 | 0 | 120 | 120 | 120 | 120 |
| Mg (ppm) | 20 | 25 | 25 | 45 | 20 | 20 | 20 | 20 |

HP: Hardwood pulp

The amount of Fe, Ca and Mg in the cellulose acylates was measured by the ICP-OES method. Before the measurement, nitric acid was added to each of the cellulose acylates and the mixture was subjected to multiwave ashing and dissolved in water.

(Evaluation of Small Defects in the Films)

The number of small defects having a size of 100 μm or more was counted by eyes in the first 100 meters and the last 100 meters of the rolled film having a length of 2000 meters. Based on the counted numbers, the total number of small defects in the full length of the 2000 meter rolled film was calculated and evaluated by the following criteria:
C: The number of small defects, 400 or more
B: The number of small defects, 200 or more and less than 400
A: The number of small defects, less than 200

TABLE 8

| | Cellulose Acetate | Number of Small Defects |
|---|---|---|
| Example 1-2 | B | A |
| Example 2-2 | C | B |
| Example 3-2 | D | A |
| Example 4-2 | E | C |
| Example 5-2 | F | C |
| Example 6-2 | G | C |
| Example 7-2 | H | B |
| Example 9-2 | E | C |
| Example 10-2 | F | C |
| Example 21-2 | F | C |
| Example 22-2 | B | A |
| Example 23-2 | C | B |
| Example 24-2 | D | A |
| Example 25-2 | E | C |
| Example 1 | A | C |
| Example 2 | A | C |
| Example 3 | A | C |
| Example 4 | A | C |
| Example 5 | A | C |
| Example 6 | A | C |
| Example 7 | A | C |
| Example 9 | A | C |
| Example 10 | A | C |
| Example 21 | A | C |
| Example 22 | A | C |
| Example 23 | A | C |
| Example 24 | A | C |
| Example 25 | A | C |

Table 8 shows that the film samples containing cellulose acetates B, C, D or H have a lower number of small defects than the film samples containing cellulose acetate A. They are preferable in reducing defects and improving yield of the display containing them. Cellulose acetate D was the best in releasing of the formed film from the casting support and the amount of trace contaminants on the casting support after the continuous production was the lowest. The film samples containing cellulose acetates E, F or G were almost equal to the film sample containing cellulose acetate A in the number of small defects and film properties.

The film samples 2-3, 23-3 and 25-3 were produced by the same process as Examples 2, 23 and 25, except that the core layer were changed as shown in Table 9 and re-stretching was conducted at 185° C. by 1.25 times. Properties of the film samples are shown in Table 10.

The film samples shown in Table 11 were incorporated in the liquid crystal panel of VA mode described in Example 3 of JP-A 2008-176281 that satisfies the inequality of thickness of liquid crystal layer, dB<dG<dR, and $dB_C$=3.3 μm, $dG_C$=3.5 μm and $dR_C$=3.8 μm wherein $dB_C$, $dG_C$ and $dR_C$ mean the thickness of blue, green and red color filter, respectively. The incorporation of the film samples were conducted in the same manner as Examples 102, 123 and 125. Table 11 also shows CR and viewing angle of the liquid crystal display that were measured by the same method as Example 102, 123 and 125.

TABLE 9

| | Constitution of Core Layer | | | | Thickness | | |
| --- | --- | --- | --- | --- | --- | --- | --- |
| | Degree of Acetyl | Additive 1 | | Additive 2 | | Core Layer | Skin A Layer | Skin B Layer |
| | Substitution | Compound | (mas. pt.) | Compound | (mas. pt.) | (μm) | (μm) | (μm) |
| Example 2-3 | 2.45 | A | 10 | — | — | 50 | 2 | 2 |
| Example 23-3 | 2.45 | D | 10 | — | — | 50 | 2 | 2 |
| Example 25-3 | 2.45 | E | 10 | — | — | 50 | 2 | 2 |
| Example 23-4 | 2.45 | D | 10 | — | — | 50 | 1 | 1 |
| Example 23-5 | 2.45 | D | 10 | — | — | 50 | 0.3 | 0.3 |

TABLE 10

| Sample No. | Re(550) (nm) | Rth(550) (nm) | Re(630) – Re(440) (nm) | Rth(630) – Rth(440) (nm) | Thickness (μm) | Haze |
| --- | --- | --- | --- | --- | --- | --- |
| Example 2-3 | 54.0 | 119.0 | 4.2 | 7.8 | 54 | 0.08 |
| Example 23-3 | 54.0 | 120.0 | 4.3 | 7.9 | 54 | 0.06 |
| Example 25-3 | 53.0 | 119.0 | 4.3 | 7.9 | 54 | 0.05 |
| Example 23-4 | 54.0 | 120.0 | 4.3 | 7.9 | 52 | 0.06 |
| Example 25-5 | 54.0 | 120.0 | 4.1 | 7.7 | 51 | 0.05 |

TABLE 11

| | Film Sample No. | CR | Viewing Angle |
| --- | --- | --- | --- |
| Example 102-3 | Example 2-3 | A | A |
| Example 123-3 | Example 23-3 | A | A |
| Example 125-3 | Example 25-3 | A | A |
| Example 102-4 | Example 2 | B | A |
| Example 123-4 | Example 23-3 | B | A |
| Example 125-4 | Example 25-3 | B | A |

Table 11 shows that Examples 102-3, 123-3 and 125-3 of the invention are excellent in CR and viewing angle. From Examples 102-4, 123-4 and 125-4, it is known that the film samples of the invention show more excellent display properties when incorporated in the multi-gap liquid crystal panel having the above color filter thickness (cell thickness).

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2009-109948, filed on Apr. 28, 2009, Japanese Patent Application No. 2009-247638, filed on Oct. 28, 2009, and Japanese Patent Application No. 2010-089211, filed on Apr. 8, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A cellulose acylate laminate film, which comprises:
a low-substitution layer comprising a non-phosphate compound and a cellulose acylate that satisfies the following formula (1):

$$2.0 < Z1 < 2.7 \qquad (1)$$

wherein Z1 means the total degree of acyl substitution of the cellulose acylate of the low-substitution layer, and
a high-substitution layer comprising a cellulose acylate that satisfies the following formula (2):

$$2.7 < Z2, \qquad (2)$$

wherein Z2 means the total degree of acyl substitution of the cellulose acylate of the high-substitution layer, and
wherein:
the high-substitution layer is laminated on at least one face of the low-substitution layer,
the in-plane retardation of the film at a wavelength of 550 nm, Re (550), is the same as or larger than the in-plane retardation of the film at a wavelength of 440 nm, Re (440), and
the thickness-direction retardation of the film at a wavelength of 550 nm, Rth (550), is the same as or larger than the thickness-direction retardation of the film at a wavelength of 440 nm, Rth (440).

2. The cellulose acylate laminate film according to claim 1, wherein the in-plane retardation of the film at a wavelength of 550 nm, Re (550), is larger than the in-plane retardation of the film at a wavelength of 440 nm, Re (440).

3. The cellulose acylate laminate film according to claim 1, wherein the high-substitution layer comprises a non-phosphate compound as an additive and the mass proportion of the additive to the cellulose acylate in the high-substitution layer is smaller than the mass proportion of the additive to the cellulose acylate in the low-substitution layer.

4. The cellulose acylate laminate film according to claim 1, wherein the non-phosphate compound is a non-phosphate ester compound.

5. The cellulose acylate laminate film according to claim 1, wherein the non-phosphate compound is a polyester compound having an aromatic ring.

6. The cellulose acylate laminate film according to claim 1, wherein the in-plane retardation of the film at a wavelength of 590 nm, Re, satisfies 25 nm≤|Re|≤100 nm and the thickness-direction retardation of the film at a wavelength of 590 nm, Rth, satisfies 50 nm≤|Rth|≤300 nm.

7. The cellulose acylate laminate film according to claim 1, wherein the thickness-direction retardation of the film at a wavelength of 550 nm, Rth (550), is larger than the thickness-direction retardation of the film at a wavelength of 440 nm, Rth (440).

8. The cellulose acylate laminate film according to claim 1, of which the internal haze is at most 0.2%.

9. The cellulose acylate laminate film according to claim 1, wherein the low-substitution layer comprises at least one retardation enhancer.

10. The cellulose acylate laminate film according to claim 9, wherein the retardation enhancer comprises a discotic compound and the content of the discotic compound is less than 3 parts by mass relative to 100 parts by mass of the cellulose acylate.

11. The cellulose acylate laminate film according to claim 1, wherein the cellulose acylate of the low-substitution layer satisfies the following formulae (3) and (4):

$$1.0 < X1 < 2.7, \tag{3}$$

$$0 \leq Y1 \leq 1.5, \tag{4}$$

$$X1 + Y1 = Z1 \tag{4'}$$

wherein X1 means the degree of acetyl substitution of the cellulose acylate of the low-substitution layer, Y1 means the total degree of substitution with acyl having at least 3 carbon atoms of the cellulose acylate of the low-substitution layer, and Z1 means the total degree of acyl substitution of the cellulose acylate of the low-substitution layer.

12. The cellulose acylate laminate film according to claim 1, wherein the cellulose acylate of the high-substitution layer satisfies the following formulae (5) and (6):

$$1.2 < X2 < 3.0, \tag{5}$$

$$0 < Y2 < 1.5, \tag{6}$$

$$X2 + Y2 = Z2 \tag{6'}$$

wherein X2 means the degree of acetyl substitution of the cellulose acylate of the high-substitution layer, Y2 means the total degree of substitution with acyl having at least 3 carbon atoms of the cellulose acylate of the high-substitution layer, and Z2 means the total degree of acyl substitution of the cellulose acylate of the high-substitution layer.

13. The cellulose acylate laminate film according to claim 1, wherein both faces of the low-substitution layer have the high-substitution layer in which the compositions of the high-substitution layers may be the same or different.

14. The cellulose acylate laminate film according to claim 1, wherein the acyl group in the cellulose acylate has from 2 to 4 carbon atoms.

15. The cellulose acylate laminate film according to claim 1, wherein the cellulose acylate is cellulose acetate.

16. The cellulose acylate laminate film according to claim 1, wherein the mean thickness of the low-substitution layer is from 30 to 100 μm, and the mean thickness of at least one high-substitution layer is from 0.2% to less than 25% of the mean thickness of the low-substitution layer.

17. The cellulose acylate laminate film according to claim 1, wherein at least one high-substitution layer comprises a matting agent.

18. A polarizer comprising a cellulose acylate laminate film, wherein the cellulose acylate laminate film comprises:
a low-substitution layer comprising a non-phosphate compound and a cellulose acylate that satisfies the following formula (1):

$$2.0 < Z1 < 2.7 \tag{1}$$

wherein Z1 means the total degree of acyl substitution of the cellulose acylate of the low-substitution layer, and
a high-substitution layer comprising a cellulose acylate that satisfies the following formula (2):

$$2.7 < Z2, \tag{2}$$

wherein Z2 means the total degree of acyl substitution of the cellulose acylate, of the high-substitution layer, and
wherein:
the high-substitution layer is laminated on at least one face of the low-substitution layer,
the in-plane retardation of the film at a wavelength of 550 nm, Re (550), is the same as or larger than the in-plane retardation of the film at a wavelength of 440 nm, Re (440), and
the thickness-direction retardation of the film at a wavelength of 550 nm, Rth (550), is the same as or larger than the thickness-direction retardation of the film at a wavelength of 440 nm, Rth (440).

19. A liquid crystal display device comprises a cellulose acylate laminate film, wherein the cellulose acylate laminate film comprises:
a low-substitution layer comprising a non-phosphate compound and a cellulose acylate that satisfies the following formula (1):

$$2.0 < Z1 < 2.7 \tag{1}$$

wherein Z1 means the total degree of acyl substitution of the cellulose acylate of the low-substitution layer, and
a high-substitution layer comprising a cellulose acylate that satisfies the following formula (2):

$$2.7 < Z2, \tag{2}$$

wherein Z2 means the total degree of acyl substitution of the cellulose acylate of the high-substitution layer, and
wherein:
the high-substitution layer is laminated on at least one face of the low-substitution layer,
the in-plane retardation of the film at a wavelength of 550 nm, Re (550), is the same as or larger than the in-plane retardation of the film at a wavelength of 440 nm, Re(440), and
the thickness-direction retardation of the film at a wavelength of 550 nm, Rth (550), is the same as or larger than the thickness-direction retardation of the film at a wavelength of 440 nm, Rth (440).

20. The liquid crystal display device according to claim 19, which is an IPS, OCB or VA-mode liquid crystal display device having a liquid crystal cell and a pair of polarizers arranged on both sides of the liquid crystal cell, wherein at least one polarizer comprises the cellulose acylate laminate film.

* * * * *